United States Patent [19]

McKeeman et al.

[11] Patent Number: 5,170,465
[45] Date of Patent: Dec. 8, 1992

[54] INCREMENTAL-SCANNING COMPILER FOR SOURCE-CODE DEVELOPMENT SYSTEM

[75] Inventors: William M. McKeeman, Hollis; Shota Aki, Weare, both of N.H.

[73] Assignee: Digital Equipment Corporation, Maynard, Mass.

[21] Appl. No.: 375,383

[22] Filed: Jun. 30, 1989

[51] Int. Cl.[5] .............................................. G06F 9/45
[52] U.S. Cl. .............................. 395/700; 364/DIG. 1; 364/280.4; 364/275.5; 364/275.6
[58] Field of Search .................... 371/19; 364/192; 395/700

[56] References Cited

U.S. PATENT DOCUMENTS

| 4,398,249 | 8/1983 | Pardo et al. | 364/300 |
|---|---|---|---|
| 4,558,413 | 12/1985 | Schmidt et al. | 364/300 |
| 4,809,170 | 2/1989 | Leblang et al. | 364/200 |
| 4,833,606 | 5/1989 | Iwasawa et al. | 364/300 |
| 4,951,192 | 8/1990 | Chase, Jr. et al. | 364/200 |

OTHER PUBLICATIONS

Compiler Construction by W. Waite and G. Goos, Springer-Verlag New York Inc., 1984, p. 8, section 1.4.

*Primary Examiner*—Gareth D. Shaw
*Assistant Examiner*—Kakali Chaki
*Attorney, Agent, or Firm*—Arnold, White & Durkee

[57] ABSTRACT

A computer-aided software development system includes programs to implement edit, compile, link and run sequences, all from memory, at very high speed. The compiler operates on an incremental basis, line-by-line, so if only one line is changed in an edit session, then only that line need be recompiled if no other code is affected. Scanning is done incrementally, generating a sequential token list which is saved in memory to be used again where no changes are made; increments of the sequential token list are reused when no changes have been made in the increments and related statements. All of the linking tables are also saved in memory so there is no need to generate link tables for increments of code where no changes in links are needed. The parser is able to skip lines or blocks of lines of source code which haven't been changed. All of the source code text modules, the sequential token lists, symbol tables, code tables and related data saved from one compile to another are maintained in virtual memory rather than in files so that speed of operation is enhanced. Also, the object code created is maintained in memory rather than in a file, and executed from this memory image, to reduce delays. A virtual memory management arrangement for the system assures that all of the needed data modules and code is present in real memory by page swapping, but with a minimum of page faults, again to enhance operating speed.

12 Claims, 15 Drawing Sheets

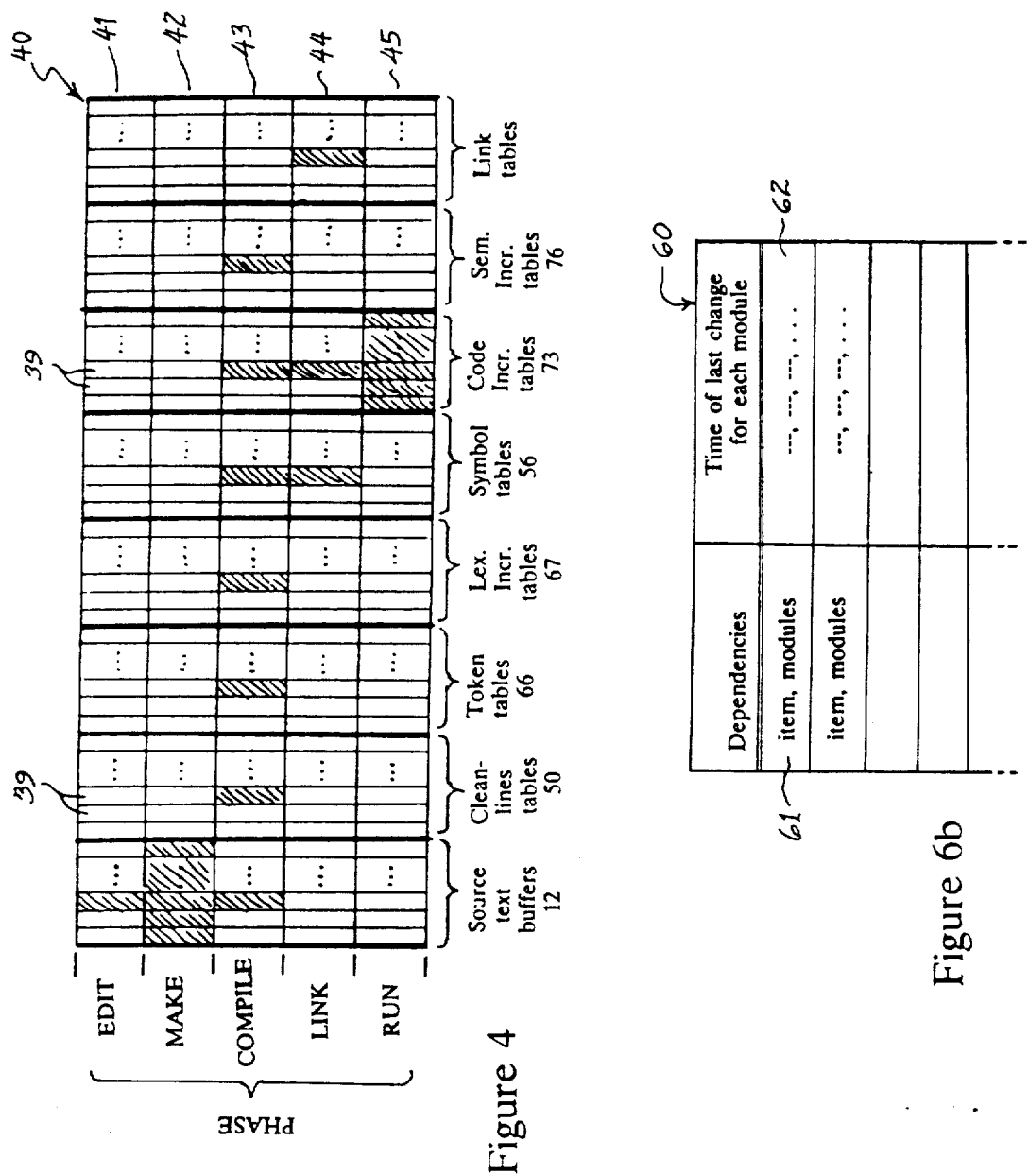

| INFO STATUS | INFO CLASS | FIXUP VALUE | FIXUP SYMBOL |
|---|---|---|---|
| NEW | DEF | WHAT VALUE | SYMBOL |
| OLD | NEED | WHERE NEED IS | SYMBOL |
| OLD | NEED | WHERE NEED IS | SYMBOL |
| DEL | DEF | WHAT VALUE | SYMBOL |

Figure 6a

| Sn | VALIDITY CHECKS NEEDED | CODE INCREMENT TO BE RE-USED |
|---|---|---|
|  |  |  |
|  |  |  |
|  |  |  |
|  |  |  |

INCREMENTAL-SCANNING COMPILER FOR SOURCE-CODE DEVELOPMENT SYSTEM

RELATED CASES

This application discloses subject matter also disclosed in our copending applications filed concurrently herewith, as follows:

Ser. No. 375,397 for "INCREMENTAL COMPILER FOR SOURCE-CODE DEVELOPMENT SYSTEM";

Ser. No. 375,384 for "Execution of edit-compile-link-run cycle from memory in source-code development systems";

Ser. No. 375,398 for "INCREMENTAL LINKING IN SOURCE-CODE DEVELOPMENT SYSTEM";

Ser. No. 375,401 for "COMPILER WITH INCREMENTAL DEPENDENCY ANALYSIS FOR SOURCE-CODE DEVELOPMENT SYSTEM" now abandoned;

Ser. No. 375,402 for "LINE-SKIP COMPILER FOR SOURCE-CODE DEVELOPMENT SYSTEM"; and Ser. No. 375,399 for "VIRTUAL MEMORY MANAGEMENT FOR SOURCE-CODE DEVELOPMENT SYSTEM".

All of said applications are assigned to Digital Equipment Corporation, the assignee of this application.

MICROFICHE APPENDIX

Included as a part of this application under 37 C.F.R. §1.96(b) is a Microfiche Appendix consisting of 5 microfiche and 202 frames.

BACKGROUND OF THE INVENTION

This invention relates to computer programming, and more particularly to computer aided software development.

The purpose of the invention is to provide a programming environment designed to enhance the speed and productivity of software development, particularly a method for substantially decreasing the time required for recompilation and relinking in the edit-compile-link-run cycle of the software development process. When code is being written, the elapsed time through the edit-compile-link-run cycle after the user makes a small change to the application source code is called the turnaround time. A primary purpose of the invention is to minimize this turnaround time.

The programming "environment" as the term is used herein means the set of programs or modules (i.e., code) used to implement the edit-compile-link-run cycle for a developer, who is ordinarily seated at a terminal and engaged in the endeavor of writing code. The environment which is the subject of this invention will be called "the environment", whereas any program being developed under the environment will be called "an application". The environment is capable of supporting the development of any application, including the environment itself. The user of the environment is called "the developer", while the user of an application is called "the end user".

Software development is characterized by a process involving the steps of editing the program, compiling and linking the program, and running the program. A compiler translates a source program that has been written in a high-level language such as Pascal or Fortran into a machine executable form known as an object program.

The software development process is further divided into stages, with the earlier stages characterized by rapid and large scale activity (e.g., editing) in all or most of the application source files, and in the later stages characterized by less frequent and smaller changes in fewer than all of the source files. During the earlier stages the objective is removing syntax errors in the source code and logic errors in the application. During the final stages the objective is improving the efficiency of the application and testing the behavior of the application in the form it will be delivered to the end user.

It is generally desirable that the quality of the object code generated by a compiler, as measured in terms of efficiency, be as good as possible. A compiler that generates very efficient object code is known as an optimizing compiler. Optimized object code is characterized by maximized efficiency and minimized execution time. However, the complex methods and techniques employed by optimizing compilers to produce highly efficient object code necessarily result in relatively long compile times.

The removal of logic errors is relatively independent of the efficiency of the implementation of the application; therefore, during the early stages of software development, it is desirable that the environment emphasize turnaround time over optimization. In addition, during the early stages it is advantageous to insert application-run-time checks for certain kinds of detectable faults such as boundary overrun. The concerns with efficiency and testing during the final stages require optimization, and the lower frequency of changes makes the use of traditional software tools effective.

The edit-compile-link-run cycle is typically repeated numerous times during development of a particular piece of software. At any stage of this activity the developer may be required to correct detected errors (as used herein, "error" means "need for a change", since the motivation for making a change may be either repairing a previous oversight or adding new functionality). Errors may be detected by the compiler, the linker, or later by the programmer during test execution. This style of interaction in conventional environments results in frequent context changes and delays for the developer. Context changes occur while the developer separately and sequentially invokes the editor, the compiler, the linker, and the application itself. Delays occur while the developer waits for these separate tools to complete their tasks.

Thus, while long compile times are tolerable in the final stages of developing an application, i.e., when generating production quality object code, these delays are not tolerable in the early stages of the process of developing, testing, and debugging software where long compile and link times will be much more noticeable since these are invoked much more often. Moreover, changes in the application code made during development are usually localized and small in size with respect to the rest of the program. In known software development environments, the turnaround time for compiling an application module is proportional to the size of the module and the turnaround time for linking an application is proportional to the size and number of modules. In the environment of this invention both compilation and linking turnaround are proportional to the size of the changes to the source code made by the developer since the last compile/link operation. Many applications programs have 100,000 to 1,000,000 or more lines of code; the turnaround time (time for the edit-compile-link-run loop to complete) in developing such programs can become an overnight activity, and thus presents a major burden.

Thus, it is desirable to provide a software development environment that would allow fast turnaround in the edit-compile-link-run cycle.

Examples of commercially available developmental compilers include "Quick C ™" by Microsoft Corporation, "LightSpeed C" by Symantek Corporation, "Turbo C" by Borland Corporation, and Saber-C by the Saber Company. These prior systems are faster than traditional batch compilers, and may provide some degree of incremental (as distinguished from batch) operation; for example, a module may be treated separately if only that module has been changed since the last edit-compile-link-run cycle. This level of incremental operation is known as coarse-grained incremental operation.

SUMMARY OF THE INVENTION

In accordance with one embodiment of the present invention, a software development system or environment is provided which operates generally on a fine-grain incremental basis, in that increments as small as a single line of code which have not been changed since the last edit-compile-link-run cycle are reused instead of being recompiled. An increment in one embodiment is a line of code (or one or more lines of code), or, as will appear, another suitable size, such as a semantic increment; at various places in the cycle the size of the increment corresponds to what is appropriate for that level. As an example embodiment, a system referred to as a rapid computer assisted software engineering and development system (for which the acronym "RCASE" is used below), is disclosed. This system provides a programming environment and a number of facilities or services designed to enhance the speed and productivity of software development engineers, in particular by substantially decreasing the time required for recompilation and relinking in the edit-compile-link-run cycle common to existing traditional software development processes. Several different features, as disclosed herein, are directed to achieving these goals. The RCASE programming environment employs a fine grain incremental (e.g., line-at-a-time) compiler including an incremental scanner, an incremental linker, and incremental module dependency analysis (make) facility, and a virtual memory manager to reduce or prevent thrashing; a context saving and switching mechanism, and a checkpoint/restart mechanism, are important features. Furthermore, the RCASE system is designed to operate with any callable editor, callable compiler, or callable debugger that conforms to various interface requirements. A callable object file transformer can be included permitting access to applications prepared outside of the environment. Access to runtime libraries is also provided.

In a programming environment according to the invention, the quality of the object code is de-emphasized because the goal of reducing the time between editing and running the program is paramount. To increase the speed of the system, the object code generated in the RCASE environment is not optimized, resides in virtual memory, and is used only for testing the application. An executable object code file is never saved to disk. Therefore, upon completion of the development phase, an optimizing compiler must be used to generate production quality object code. Most of the presently-available developmental compilers such as those mentioned above have as one of their objectives the production of saved, non-optimized, object code; but as developers make demands upon those writing the compilers to improve the object code generated by the developmental compilers, the development systems become slower. Accordingly, an important distinction between the present invention and known software development systems (except Sabre-C) is that the RCASE environment is directed to assisting the programmer in producing quality source code quickly and efficiently, as opposed to generating usable object code.

BRIEF DESCRIPTION OF THE DRAWINGS

The novel features believed characteristic of the invention are set forth in the appended claims. The invention itself, however, as well as other features and advantages thereof, will be best understood by reference to a detailed description of a specific embodiment which follows, when read in conjunction with the accompanying drawings, wherein:

FIG. 3b illustrates a source text image from a single application module in contiguous pages of the virtual memory arrangement of FIG. 3a;

FIG. 4 is a memory map illustrating the total memory demand of the software development system of the invention and the relationship between modules and various phases of activity in this system;

FIG. 6a is a diagram of the format of a linker table prepared by the compiler 11 for each module 12;

FIG. 6b is a diagram of the format of an incremental dependency analysis table prepared by the compiler 11 for use by the "make" function of the environment of one embodiment of the invention;

DETAILED DESCRIPTION OF SPECIFIC EMBODIMENTS

Figure 1:
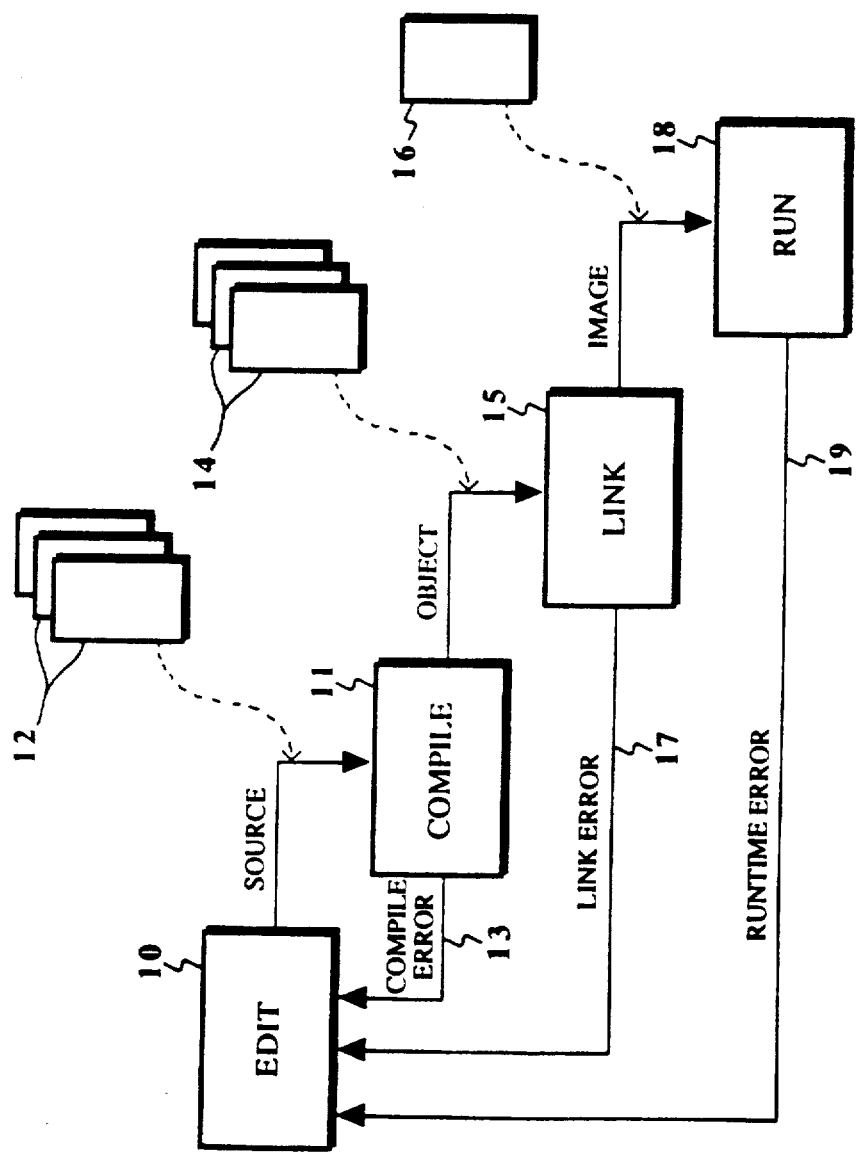
FIG. 1 is a simplified chart of a classic edit-compile-link-run cycle as may be implemented using the environment of the invention.

With reference to FIG. 1, a chart of the edit-compile-link-run cycle is illustrated. During software development, this cycle is typically repeated many times. An edit function 10 is executed so long as the developer is writing or changing the source code. In traditional systems the source text is in a file structure, but according to this invention the source text is maintained in buffers in memory. When the developer has reached a point where he wishes to test the code he has written, the compiler 11 is invoked. The input to the compiler 11 is the source code text produced by the editor 10. There are typically a number of source code text buffers 12, one for each module of the application under development; according to one feature of the invention, those modules 12 which have not been changed or are not dependent upon changed code are not recompiled. If an error is found by the compiler 11, the operation is returned by path 13 to the editor 10 with a notification of the location and nature of the error; a feature of the invention is that upon recognizing the first error the compiler reports the error, quits, and returns to the editor, rather than completing and returning a list of all of the errors found. If no errors occur during the compile phase, then the object code tables 14 (and other information as will be described, collectively referred to as code-data-symbol buffers) produced as an output of the compiler 11 are the input to a linker 15. Again, there is a code table 14 associated with each source code text module 12, as well as other data structures as will be explained associated with each module. The linker 15 produces as an output the executable object code image 16 in memory, although again the operation is returned to the editor 10 via path 17 if an error is encountered when linking is attempted; again, the quit-on-first-error principle is used. The executable code image 16 actually consists of the code tables 14 plus a link table produced by the linker 15 along with information from run-time libraries, but in any event the code image (in memory) is executed as indicated by the run function 18. If logic errors or runtime errors are discovered during the run phase, the programmer returns to the edit phase. The code image 16, after being run with no error reported, would be saved as debugged object code in traditional systems; however, according to the present invention, the desired objective is debugged source code, i.e., the source text modules 12. That is, the purpose is to provide a tool for aiding the developer in generating source code, not object code; therefore, an optimizing compiler would be later used to generate production-quality object code from the debugged source text modules 12.

As FIG. 1 indicates by the paths 13, 17 and 19, an error may be discovered at either compile, link, or run time. Discovery of an error requires the developer to edit the source code, and then the compile-link-run part of the cycle is implemented again. In most systems, the turnaround time to complete this cycle results in the developer wasting time and losing concentration because of dealing with slow and perhaps clumsy tools rather than with the problems of the application itself.

Figure 2:
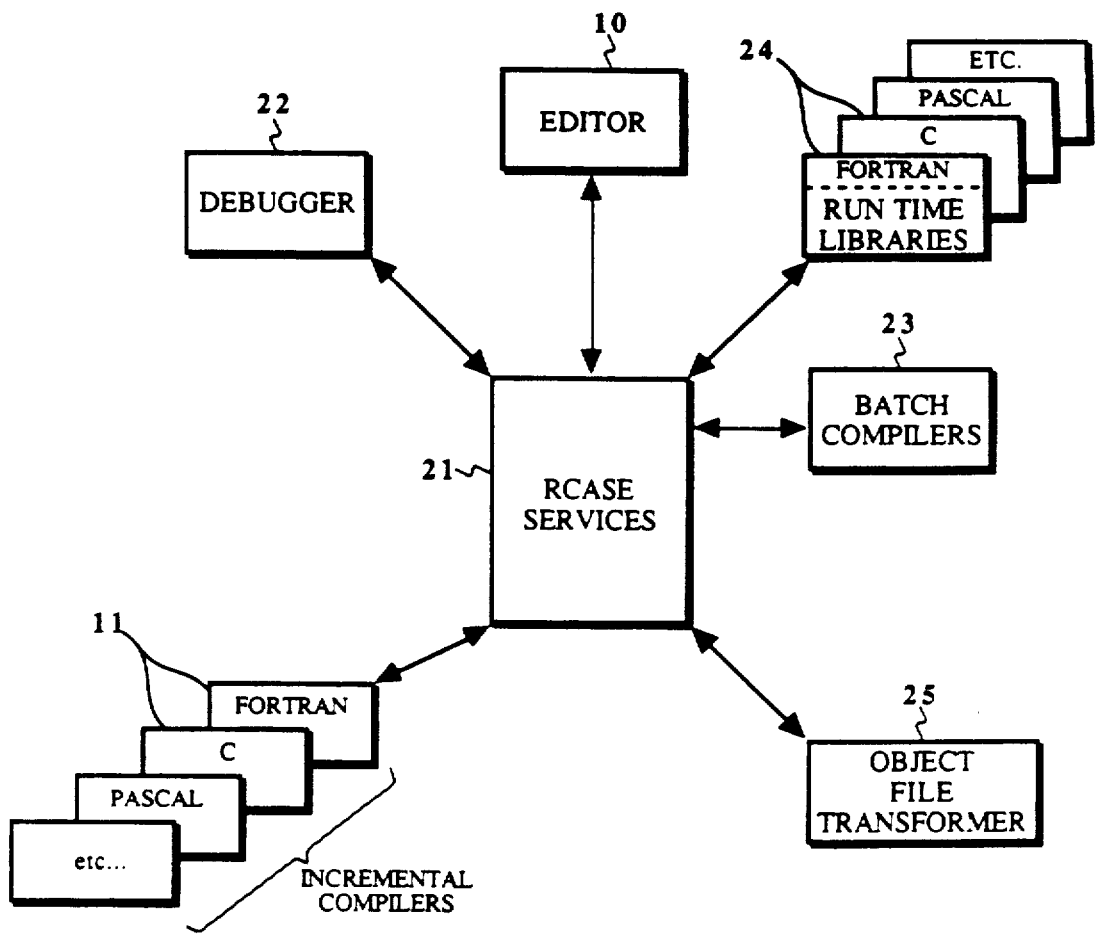
FIG. 2 is a simplified diagram of the components of the environment according to one embodiment of the present invention.

FIG. 2 shows a simplified diagram representing the rapid computer aided software engineering or RCASE environment 21 of one embodiment of the present invention. RCASE is a program which accomplishes the bulk of its services via sharable links to other large programs typical of a software development environment, such as editors, compilers, etc. For example, RCASE provides a means of communication and cooperation between the editor 10 and the incremental compiler 11 of the present invention. The editor 10 knows what source code in the modules 12 has been modified during a program editing session, and the compiler 11 remembers via the code tables 14, and other data structures, various expensive-to-compute values from the previous compile. When the editor 10 and compiler 11 agree that an old value is still valid, the old value is reused and therefore need not be recomputed. The RCASE environment 21, in addition to the editor 10 and the incremental compiler 11 as will be described, can, in a fully populated embodiment, call upon various other services such as a stand-alone debugger 22 of the type which may be commercially available, perhaps various batch compilers 23, run time libraries 24 for each language, and an object file transformer 25. In an expanded embodiment, the RCASE environment can process source code of various languages such as C, Fortran, Pascal, etc., as indicated by the multiple blocks 11, although it is understood that features of the invention may be used in compilers dedicated to one language, such as C.

A listing of the source code in C language for one embodiment of the invention is set forth in the accompanying Microfiche Appendix. This source code listing of the Appendix includes the following modules:

| Title | Purpose |
|---|---|
| RCASE Sources (Including Incremental Linker) | |
| RCASE_symbols (.sdl) | constants and definitions shared by RCASE, its editors and compilers |
| RCASE_symbols (.sdl) | constants and definitions shared by RCASE, its editors and compilers |
| RCASE.h | include file for RCASE |
| RCASE_link_tables.h | include file for RLINK table manager |
| RCASE_VERSION.H | RCASE versioning data for RCASE |
| RCASE_allocate.h | include file for RCASE Allocator |
| RCASE.c | main () for RCASE |
| RCASE_activate.c | interface for activating an editor, compilers, obj processor |
| RCASE_allocate.c | RCASE slot allocator |
| RCASE_build.c | RCASE builder |
| RCASE_checkpoint_restart.c | RCASE logic for checkpoint & restart |
| RCASE_callbacks.c | editor/compiler/etc callbacks for RCASE |
| RCASE_compile.c | RCASE logic for performing the compilation |

-continued

| Title | Purpose |
|---|---|
| | phase |
| RCASE_compiler_services.c | RCASE services for callable compilers |
| RCASE_demons.c | integrity checker for RCASE slot allocator |
| RCASE_link.c | RCASE linker |
| RCASE_link_images.c | RLINK sharable images table manager |
| RCASE_link_symbols.c | RLINK symbol (string table) manager |
| RCASE_link_tables.c | RLINK table manager |
| RCASE_session_manager.c | RCASE logic for session management |
| RCASE_util.c | utilities for RCASE |
| RCASE.opt | options file for mms$exe:RCASE.exe, DCASE.exe |
| XEDITOR Sources | |
| XED_VERSION.H | RCASE versioning data for stub editor |
| xed.h | interfaces internal to XED editor |
| XED.C | standalone-activation module for stub editor |
| XED_ACTIVATE.C | RCASE activation logic for stub editor |
| XED_ALLOC.C | storage allocator for stub editor |
| XED_CME.C | XED Command Interpreter |
| XED_SERVICES.C | XED services for RCASE |
| MMS$:XEDSHR.OPT | linker options file for building callable XED editor (used by RCASE) |
| MMS$:XED.OPT | linker options file for building standalone XED editor |
| XC Sources (Incremental Compiler XC) | |
| xc.h | interface between major modules |
| xc_arithops.h | codes for pfn expressions |
| xc_cfg.h | rule names for cfg.txt for X |
| xc_chtype.h | define classes of characters |
| xc_emit.h | internal interface between emitter modules |
| xc_inctables.h | include file for XC incremental table manager |
| xc_parse.h | internal interface between parser modules |
| xc_tokens.h | public list of token codes |
| xc_vaxops.h | give mnemonic names for some vax 11 opcodes |
| xc_version.h | RCASE versioning data for proto compiler |
| xc.c | XC is standalone interface to the callable XC compiler. It uses the callable compiler XCSHR.OBJ etc. |
| xc_emit_dump.c | debug emitters |
| xc_activate.c | RCASE activation logic for XC compiler |
| xc_context.c | context switching logic for XC |
| xc_scan.c | scanner interface to RCASE |
| xc_scanline.c | scan line |
| xc_program.c | recursive parser/generator for X programs |
| xc_stmt.c | parser for X statements |
| xc_decl.c | parser for X nomenclature |
| xc_expr.c | recursive parser/generator for X expressions |
| xc_symbol.c | skeletal symbol table for XC compiler |
| xc_gen.c | generator implementation of X |
| xc_emitvax.c | skeletal emitter for vax (int, bool, and branches) |
| xc_exprvax.c | expression code generator for vax (minimum optimization version) |
| xc_linkvax.c | link table builder |
| xc_incrvax.c | incremental compilation logic for XC emitters |
| xc_inctables.c | XC incremental table manager for token, semantic and lexical increments |
| xc_journal.c | XC journal manager for Emitter and Symbol Table Actions |
| xc_rtl.c | runtime library for XC |
| xc.opt | describe standalone XC |
| xcshr.opt | describe shareable XC compiler build |
| xc_rtl.opt | link commands for XC runtime library |

One of the important features of the present invention is a memory management scheme designed to insure that for a given phase or sub-phase of the edit-compile-link-run cycle of FIG. 1, data or text necessary for the current operation (as well as the code to execute this phase) remains in real memory (as opposed to being paged to disk by the virtual memory system) and is immediately accessible. Reduction of page faults and hard disk accesses results in much faster turnaround in the edit-compile-link-run cycle. This is accomplished in part by maintaining each source module in its own contiguous memory space. While a programmer is editing a program, it is likely that multiple source files 12 will be opened but only one is actually being edited at any moment. These source text files 12 reside in an in-memory structure called a buffer or module.

Figure 3:
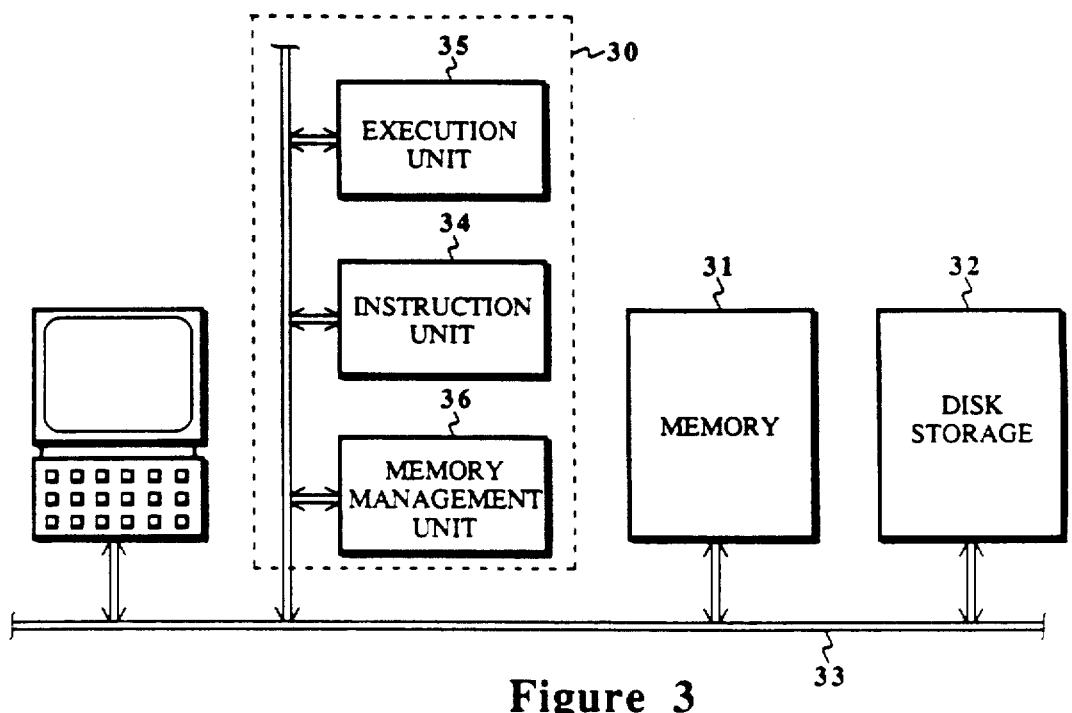
FIG. 3 is a block diagram of an example of a computer system which may use the environment of the invention.
Figure 3A:
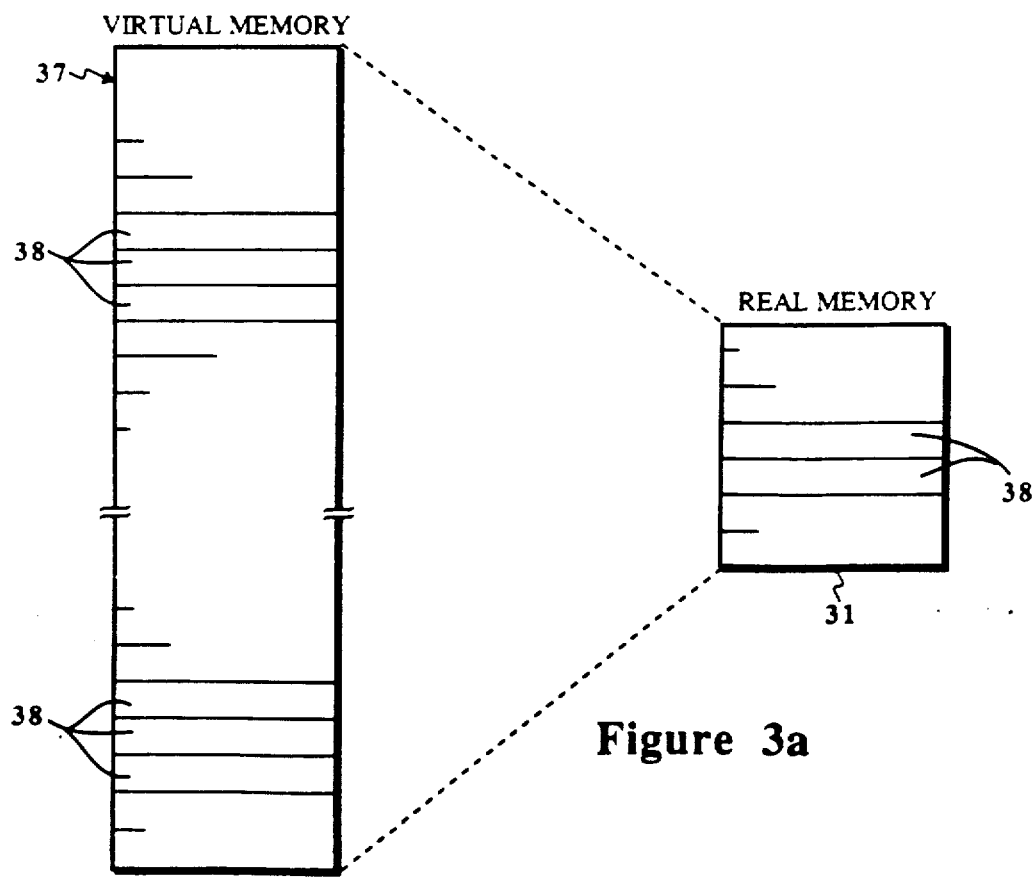
FIG. 3a is a memory map of a virtual memory system used according to one feature of the invention.

Referring to FIG. 3, a computer system which may be used to execute the development system of the invention is illustrated. The system includes a CPU 30 coupled to a main memory 31 and to a disk storage facility 32 by a system bus 33. In one embodiment, the system uses the VAX® computer architecture and the VAX®/VMS operating system, both commercially available from Digital Equipment Corporation; however, other computer systems employing paging functions and using other operating systems such as UNIX having virtual memory management are useful as well, and, as noted below, if the operating system does not include paging then the same effect can be added to the environment. The main memory 31 usually consists of perhaps several megabytes of RAM, depending upon the size of the system chosen, and is volatile since dynamic RAMs are usually used. The disk storage 32, on the other hand, has a size of perhaps many hundreds of megabytes, and is non-volatile. The access time for the main memory 31 is in the order of 100-nanoseconds, whereas the disk storage has an access time measured in tens of milliseconds. Of course, the cost per megabyte of storage is much less for the disk storage 32 than for the main memory 31. The CPU 30 includes an instruction unit 34 which fetches and decodes instructions from the memory 31, and includes an execution unit 35 for carrying out the operation commanded by the instructions and generating addresses for operands; in addition, a memory management unit 36 is included, and this unit references page tables (and usually contains a translation buffer) for translating virtual memory addresses generated in the instruction unit 34 or execution unit 35 into addresses in real memory 31. As depicted in FIG. 3a, a memory map of a virtual memory system, as implemented with the typical VAX/VMS or UNIX operating systems, includes a virtual memory space 37 having, for a CPU architecture with 32-bit addresses, 4-Gigabytes of addressable locations (indeed, the virtual memory space usually exceeds the size of the disk storage 32), whereas the real memory 31 may be, for example, 2-Mbytes. The virtual memory space is divided into pages 38, with each page being, for example, 512-bytes in size. Thus, for this example, there are eight million page locations in virtual memory 37, but the real memory 31 can at any one time contain only about 4000 pages, and a significant part of this will be occupied by the operating system. In a typical virtual memory management unit 36, the page tables and translation buffer contain an entry for each page, with each entry including the high-order address bits of the pages currently resident in real memory 31. When a memory reference is made by an address generated in the execution unit 35 or instruction unit 34, and the memory management unit 36 does not find a match in the translation buffer, or the page tables indicate the page is not in real memory, then a page fault is signalled. Implementing a page fault consists of jumping to a routine in microcode or in the operating system which executes a page swap, i.e., writes one of the pages in real memory 31 to the disk 32 and reads the page from disk 32 containing the address in question into real memory 31, after which the flow returns to the instruction which generated the page fault. Page swap operations introduce a considerable delay due to the disk accesses that are required, and so are to be minimized, particularly where a system such as the environment of the invention, making large demands upon memory, is in use.

Figure 3B:
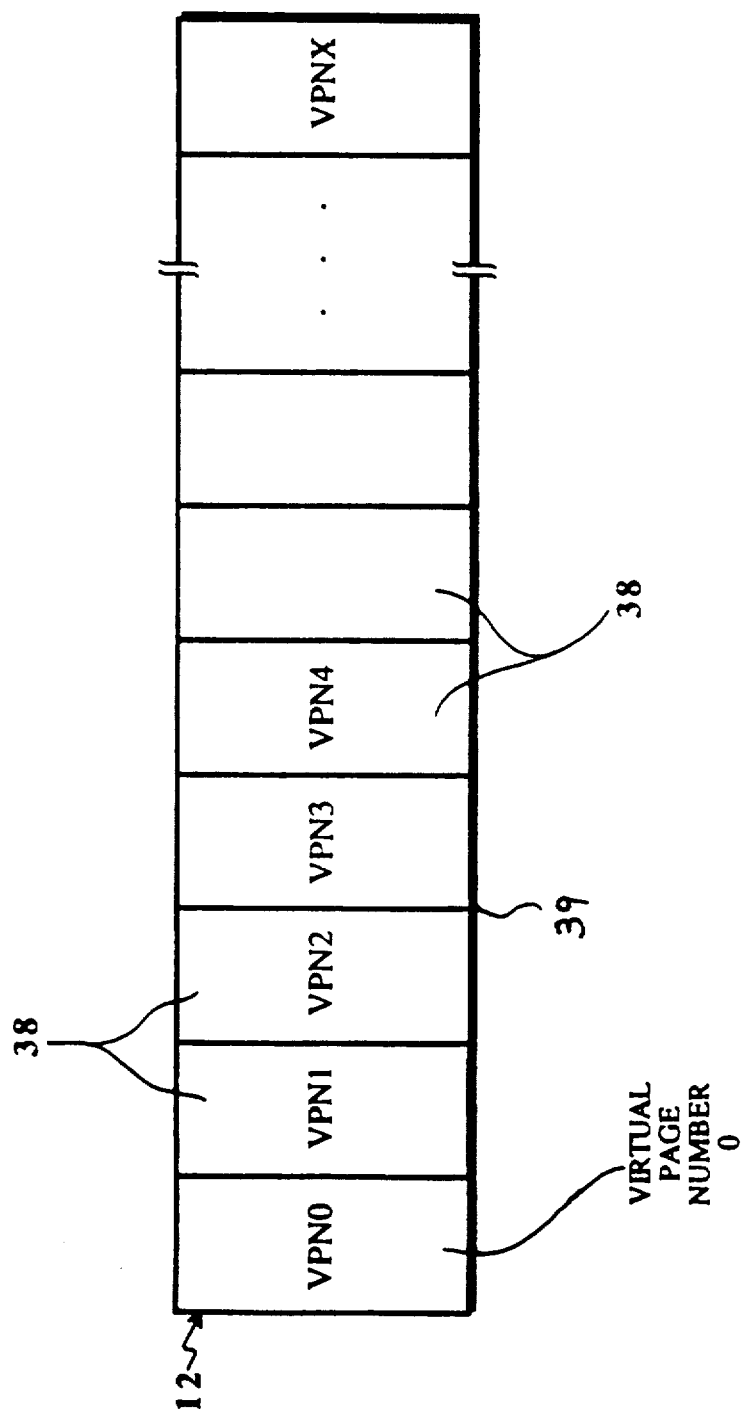

To this end, referring to FIG. 3b, for each source module 12 a block 39 of virtual memory 37 is allocated to hold that module in contiguous pages 38 of virtual memory, and no text or information from any other module (e.g., other ones of the modules 12, or any other data such as tables 14) is allowed to infiltrate any page 38 within the memory space allocated for this module 12. This same constraint is imposed for each one of the other modules 12, code tables 14, and all of the other tables, buffers and the like which will be referred to herein. This scheme prevents multiple page faults and disk accesses while operating on a single module. This memory management scheme is used not only for source text modules 12, but also for the various tables and data structures generated during the compile and link phases of activity, i.e., when the compiler 11 or linker 15 is executing. Allocation of memory is accomplished in the preferred embodiment of the present invention using the REALLOC function from the standard C programming language. That is, while a source text module 12 is being edited, its size may exceed the space previously allocated for it, and so a disjoint page would be started; however, before this happens, a REALLOC function is performed which allocates a contiguous block of memory to re-establish the data structure of FIG. 3b.

Thus, as memory demand for a particular data structure or module increases beyond the bounds of the originally allocated block 39 of memory, a new block of contiguous memory must be allocated. If possible, the original block 39 will simply be extended, but this usually results in overlap with the successive block, thereby requiring allocation of a new block in a different location. If a new location is used, the data must be moved to the new location, an action automatically accomplished by the REALLOC function. This is a portable means of accomplishing an effect otherwise implemented by operating system dependent mechanisms such as "zoned memory". In any particular implementation of RCASE the less portable but more efficient system-specific zoned memory management facilities may be substituted for the portable version. Note also the implication this method has with respect to pointers. If a table containing pointers is reallocated, the pointers will be wrong. Therefore, to achieve the high speed results of the present system, pointers cannot be used in any table that may get moved during a reallocation process.

To use the environment as described herein with an operating system which does not have automatic paging, the advantages of the invention can be achieved by adding file reads and file writes in the appropriate places, so that during each phase the appropriate data structures are in real memory.

During the software development process, there are many source modules 12 and several possible phases of activity (e.g., editor 10, compiler 11, linker 15). Thus, the total memory demand is demonstrated by a two-dimensional matrix 40 (i.e., a memory map) as shown in FIG. 4, where rows 41, 42, 43, 44 and 45 represent phases and each column 46 represents a virtual memory block 39 corresponding to a source text module 12, or a data structure such as a table or list generated by one of the other parts of the environment (such as cleanlines tables, token tables, etc., as will be described). Note that there are a number of columns 46 for each type of data structure, corresponding to the number of modules 12 of source text in the application being worked on. For the edit phase 41 (when editor 10 is being executed), real memory is needed only for the source text of one module 12 at a time; all other data can be paged out. The blocks 39 present in real memory are represented by diagonal shading. For the compile phase 43 (when compiler 11 is executing), real memory is needed only for the changed part of the source text module 12 and the saved information internal to the compiler (as will be discussed, this includes the token lists, symbol tables, etc.) associated with the one module 12 being compiled at any given moment; all other data can be paged out. For the link phase 44 (when linker 15 is executing), memory is needed only for the link tables and compiled code. During the run phase 45, only the code increment tables are used. So, in each phase, only a small part of the information associated with each module 12 is employed and thus must be in real memory; the rest of the information for a given one of the modules can be paged out. Therefore, regardless of the total memory demand, the instantaneous memory requirements, as defined by a given phase/module relationship of FIG. 4, are satisfied by having only that which is absolutely necessary in real memory. This reduces accesses to virtual memory 10 (page swapping to disk) thereby increasing the execution speed of the current phase. When a new phase is started, there is virtual memory activity required to page out the information no longer needed in favor of the information for the new phase as it is requested. Since this is accomplished in a regular manner, it is relatively efficient.

As a rule of thumb, the memory requirement in using the environment of the invention, expressed in number of bytes of virtual memory needed, is about five times the number of bytes of text in the source modules 12. Each line of code contains, on average, about forty bytes, so an application containing 100,000 lines of source code (40×100,000 or 4-Mbytes) would require five times 4-Mbytes or 20-Mbytes as a total memory requirement. While some computer systems might allow use of this much real memory, it is nevertheless expensive and rules out use on lower level systems. Further, the memory demands in developing an application containing, for example, 1,000,000 lines of source code become prodigious-200-Mbytes. The advantages of using a virtual memory system with page swapping minimized during a given phase become apparent.

Figure 5:
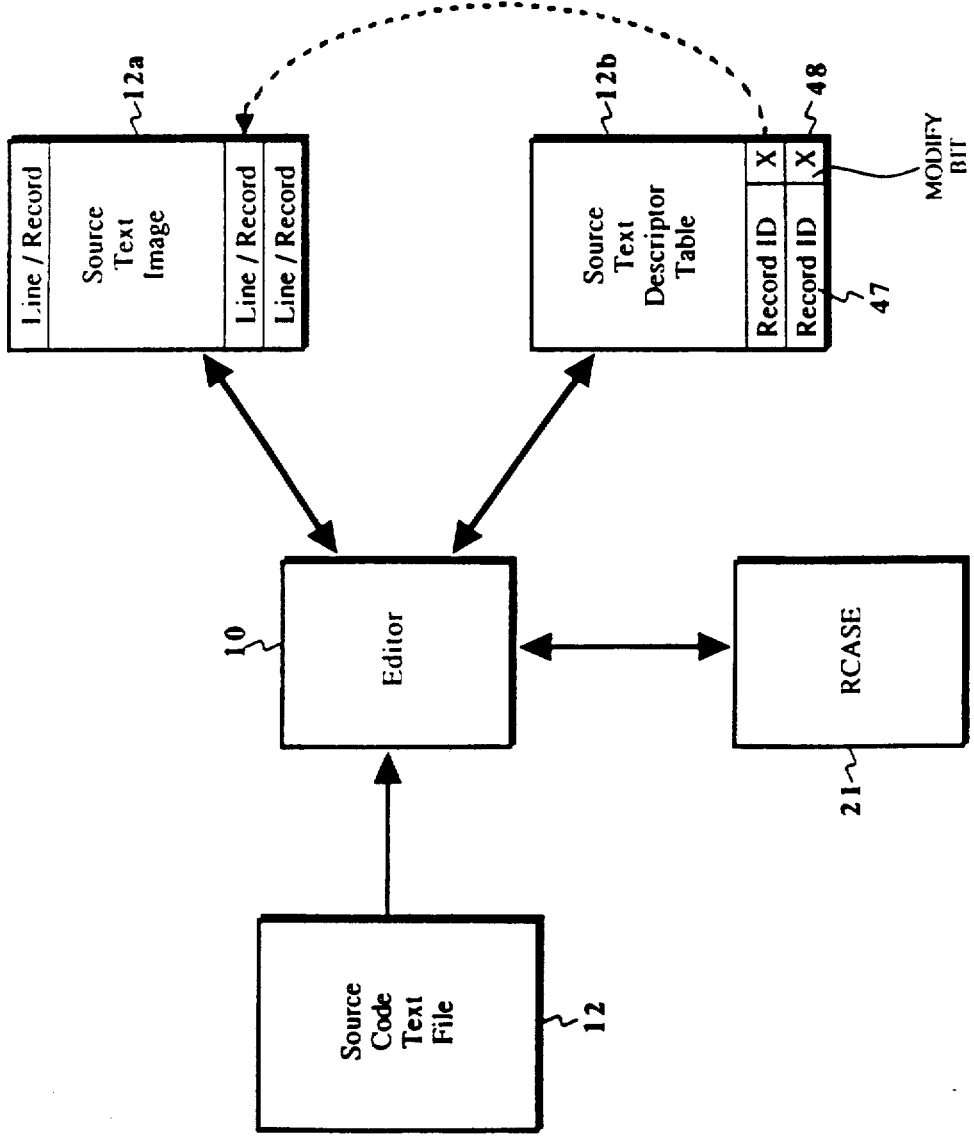
FIG. 5 is a diagram of a part of the environment of the invention, illustrating the relationship between RCASE, the editor, and the source text and associated modules.

The information maintained in memory by the editor 10 with respect to each open source file includes a source text image module 12a and a source text descriptor table 12b as illustrated in FIG. 5. The descriptor table 12b contains information about the lines of text in the source text module 12a including record identifiers 47, record lengths, and a special bit 48 associated with each line or record called the modify bit which is used to indicate whether a particular line of source text has been modified. This bit is set to a logical 1 by the editor 10 if its associated line is edited. RCASE can set the modify bit back to 0 after inspecting it. The source text module 12a and the source text descriptor table 12b reside in separate disjoint memory spaces (different blocks 39 in virtual memory 37). This allows the record descriptor information to be inspected (paged into real memory 31) without the need to bring the source text module 12a itself into real memory. This is advantageous since the descriptor table 12b is typically much smaller than the source module 12a itself.

In the compilation mode, the compiler 11 saves information gathered during the compilation of a module 12, with this information also allocated so as to be separate (in a block 39 as in FIG. 3b) from other information saved by this compiler for other modules 12, or any other attached compiler, and also from any information saved by the editor 10.

It should be noted that the above feature derives from the use of callable compilers as opposed to batch compilers. That is, normally batch compilers simply compile the source code and leave the results of the compilation in secondary memory 32 (e.g. a hard disk). In the case of callable compilers, the compilers are dynamically linked into RCASE and a compiler 11 keeps information in virtual memory 37 between compilations, including saved context for each application module 12 which speeds up subsequent compilations of that module.

The memory management system for incremental compilation thereby allocates contiguous space as seen in FIG. 3b for each separate data structure required in compilation, thereby insuring that, except perhaps for the first and last pages, the pages each contain nothing except the data selected by the rules described above.

In summary, therefore, the function of the memory management system of the present invention is in the requirement that all code and data required for an editing, compilation, or linking operation be resident in virtual memory, and the structure of data permit the selection of a small part of the whole data structure appropriate to each phase of the edit-compile-link-run cycle, so that the instantaneous demand on real memory is minimized. This is accomplished in a portable implementation by using the C language standard function REALLOC to extend each separate data structure when necessary so that each separate data structure is in a contiguous address space in virtual memory, and therefore (except at each end) guaranteed to exclude information from any other data structure.

In a batch compiler, the compiler reads each line of source text for a module anew at each compilation, records its results in the file system, and exits. In accordance with the present invention, new functionality and data structures are provided which allow the compiler to reuse previously gathered information (e.g., compiled code, link lists, etc.) at recompilation time if the source text has not been changed, thereby substantially reducing the time required for recompilation after editing of the source text. The saved information is organized as a journal of activity across an internal interface between the modules of the compiler. The basis of this aspect of the invention is that if the input has not changed, and certain other validity checks are passed, the contents of the journal will be the same as what would pass across the interface if the computation were repeated, and therefore the journal can be played out to revalidate the saved data instead, skipping the costly computation that led to the production of the journal in the first place.

Any interface within a compiler can be journalled. The current implementation journals the interface to the scanner, the emitters and the symbol table. Each different computer language, and each different way of organizing a compiler, provides the engineer the information needed to decide which interfaces to journal for most effective savings in turnaround time. Once the interfaces are chosen, and the journals are designed, it is often possible to optimize the journals themselves by combining several separate journal entries into a more efficient larger combined entry. Examples of such combination are the collection of a sequence of 1-byte emitter calls into a single n-byte emitter call which in this implementation is effected by revalidating the previously emitted code already in the table 73 where the emitter 72 left it (see FIG. 7), and the combination of many separate checks of many attributes of a symbol in the symbol table into a single check of all attributes at once.

The location of the journals can variously be in the static state of the component of the environment that produced them or in a general journalling mechanism provided by RCASE itself. The choice is an engineering trade off, taking into consideration other uses to which the incremental compiler might be put (for example, batch use), which implementing team has the expertise to implement the various algorithms, and the overall performance and structural integrity of the components of the environment. Both styles of implementation are used in RCASE.

Each time a journal is replayed for effect, the corresponding application source code must be skipped so as to reposition the compiler to either reuse or rebuild the next journal. The amount of source code consumed in building a journal is always an integral number of application source lines and therefore the amount to skip, recorded along with the journal, is also an integral number of source lines. The number of lines is called the increment size.

Figure 6:
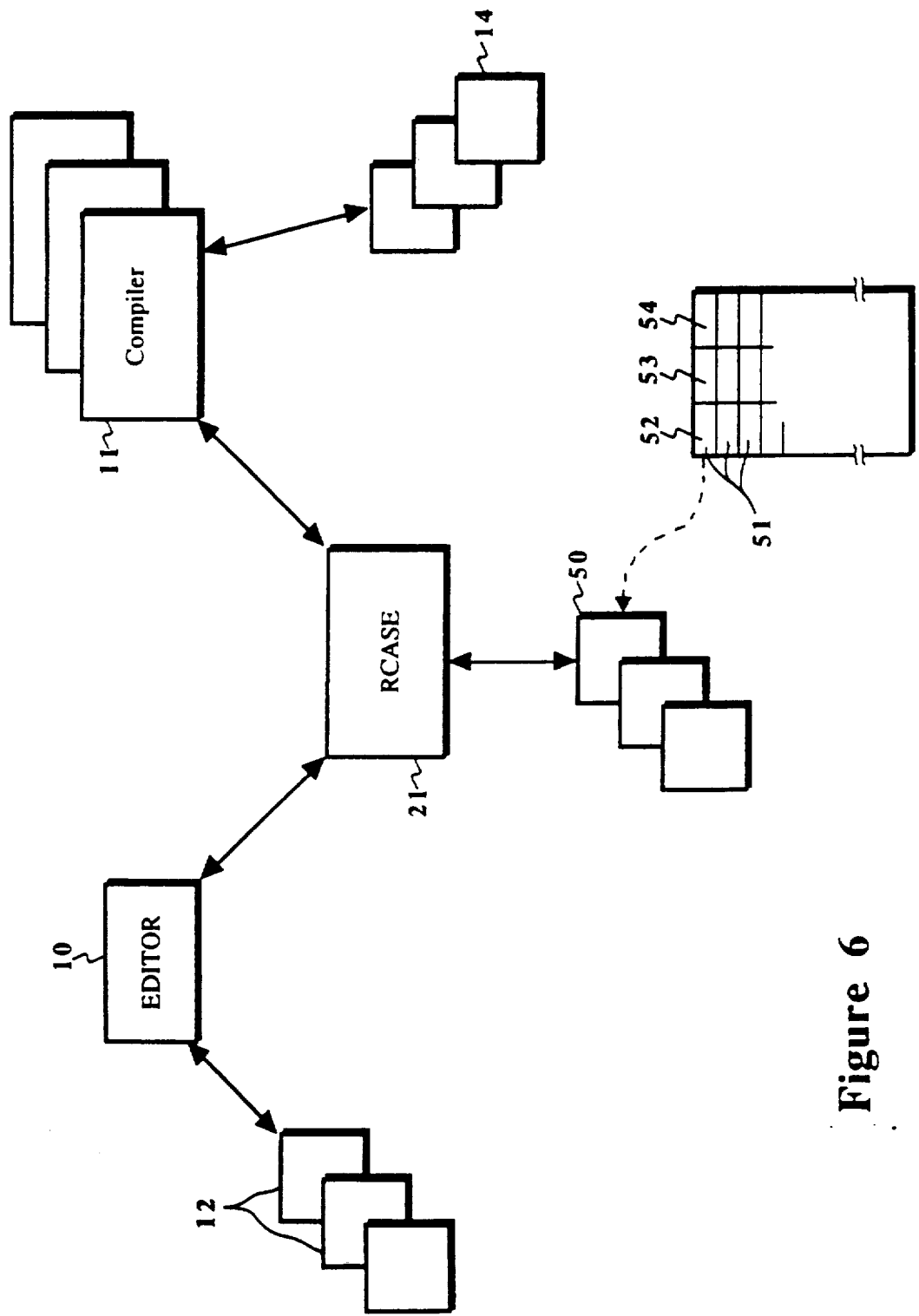
FIG. 6 is a diagram illustrating the relationship between the editor, the RCASE module, and the compiler of the system of the invention, and illustrating the context in which the incremental compiler resides.

Referring to FIG. 6, RCASE manages this activity with an internal data structure called the cleanlines table 50. There is one cleanlines table 50 for each application source module 12. RCASE switches between tables 50 when context is changed. A cleanlines table 50 has one entry 51 for every source line in the associated application module 12. Each entry 51 of the cleanlines table has the following information: (1) a field 52 to locate the application source line description and text, (2) a field 53 of how many source lines from the current point toward the end of the application source buffer 12 are unmodified since the last use of their information (clean), and (3) a field 54 of information provided by the compiler 11 which is, in fact, the compiler's means of locating all saved information associated with this line. The cleanlines table 50 can be built in a variety of ways. The current implementation makes a pass over the information records in the source buffer 12 (or its descriptor table 12b), examining the clean bits 48, and building the cleanline entries 51 while at the same time deleting invalid entries and inserting newly required ones.

It is also feasible to keep the cleanlines table 50 up-to-date via callbacks from the editor 10, notifying RCASE whenever a line of application source code is changed. This second solution leads to faster turnaround but makes more demands on the editor 10 and is more complex to implement.

In the RCASE environment, referring to FIG. 6, the compiler 11 retains the scanner function and, at the first compilation, the compiler 11 reads the source text 12 in the conventional fashion, except that it comes through RCASE 21 from the editor memory image 12 instead of from a file. In addition, however, the compiler 11 also constructs a token table which contains, for each lexical unit of information in the source text, the corresponding collected and computed information with each such lexical unit of information being identified and indexed by a corresponding token (see FIG. 8). The scanner journal is built for the fewest lines possible. Typically that is one line, although there are programming language features that require more than one line to be recorded in a single lexical increment (See FIG. 9 for an example). The compiler 11 passes to RCASE 21, for each line of source text, the corresponding sequence of tokens and RCASE saves each line in the form of the tokens (see FIG. 9a).

To describe this operation in a slightly different manner:

(1) The source text (from buffer 12) comes from the editor 10 through RCASE 21 to the compiler 11 a line at a time, passed as a pointer;

(2) The compiler 11 scans the source text, tabulates the tokens, and passes the locations of the tokens back to RCASE 21;

(3) RCASE hands the token locations back to the compiler 11 when a token is needed.

This is an example of using RCASE 21 itself as the journalling agent. The alternative is to keep the journal within the scanner and have the scanner check to see if the application source text is unchanged so that the token journal can be reused.

A second set of journals managed by RCASE records emitted code. For the more modern computer languages the structural nesting of the language can be reflected into a nested set of saved code fragments. The goto statement violates this structure and must be treated with special records of information. For older languages such as Fortran, the goto is so pervasive that nested fragments are unfeasible and the goto therefore does not need special records. The advantage of nested fragments is that it is more efficient to reuse a containing fragment and all its internal fragments as a single journal item than it is to reuse the larger number of non-nested fragments. The types of fragments in the C programing language are expression statements (non-nested), conditional statements (if and switch), loops (for, while and until), blocks, and function definitions.

Each time the compiler 11 discovers the beginning of a saveable structure, it sees if there is a reusable fragment by various checks including the presence of a valid save field in the RCASE cleanlines table 50 (see FIG. 6). If it can be reused the journal is played out, and RCASE is instructed to skip ahead the appropriate number of application source lines. Otherwise a new journal is built and its location is recorded in the cleanlines table 50. During a rebuild of a fragment (called a semantic increment), the compiler 11 will use the journalled scanner information. When the actual text has been modified, the scanner journal will also have to be rebuilt before it can be played out. To summarize these operations:

(1) The start of a programming construct which is permitted to form a semantic increment is encountered. This is discovered either by examining the leading tokens of the contruct or by having previously examined them and recorded the result.

(2) The possibility of replaying the journal is checked: the source text must be unmodified, there must be a valid saved field for this construct in RCASE, the fragment must still be consist with information in the compilers tables.

(3) If all checks pass, the journal is played out and the application source text is skipped. If some check fails, the journal is discarded, the tokens recompiled to build a new journal, and the new journal is played out. The location of the new journal is passed back to RCASE for future reference.

(4) In some circumstances (generally bad application source text formatting) a journal that aligns with application text record boundaries cannot be built. In this case no journal is recorded, at the cost of losing the possibility for reuse later.

Steps 1, 2, 3 and 4 of the above has at least two forms: run effects and symbol effects. The former is represented by hard-compiled code with perhaps some pending fix-ups while the latter is represented by a series of symbol table actions. Most statements have some elements of both types. The minimum unit of saving is the line, although multiple contiguous lines can be bundled into a logical line for state saving.

A third set of journals managed by RCASE records symbol names and attributes. The interface is to the symbol table 56 (seen in FIG. 7 and 7a). The journalled actions are scope entry and exit, symbol lookup and enter, and get and set for any attribute. Typically the symbol enter and attribute setting is done in response to a declarative construct in the application language. Typically the symbol lookup and attribute getting is done in response to an executable construct in the application language. Atypically there are situations which can cause any of the actions in association with any of the application language constructs.

The symbol table 56 of the interactive compiler 11 to be completely incremental would have two unique attributes beyond the structure required for batch compilers: 1) no information can be deleted from the symbol table at scope exit and 2) every piece of information must be accompanied by a validity bit. In the alternative, instead of every piece of information having a validity bit, a single validity bit can be used for the entire table entry. When a new compilation of an application source module 12 is begun, the fully developed symbol table 56 from a previous compilation is present, with all validity bits set to false. Each action that would enter information in the table 56 falls into one of three categories: 1) the information is found and marked invalid—the response is to mark it valid, 2) the information is found and marked valid—the response is to issue an error diagnostic and terminate the compilation, 3) the information is not found—the response is to enter it, so long as it is consistent with all information currently marked valid.

Each action that would take information from the symbol table 56 is journalled as a check to see that the expected answer is the found answer. The purpose of these journals is to check that the assumptions under which an executable journal was built (the previous section of this explanation) are still valid.

There are three situations: 1) the information is found and marked valid—the response is to permit reuse of the executable journal, 2) the information is found and marked invalid—the response is to invalidate the executable journal and rebuild it, 3) the information is not found—the response is likewise to invalidate the executable journal.

In the process of rebuilding an executable journal the same three situations can occur. In case 1) the rebuilding continues. In cases 2) and 3) the rebuilding ceases, an error diagnostic is issued and control is returned to the developer to correct the situation.

Upon closing a scope, either played out of a journal or during a rebuild of a block, all of the local information in the symbol table 56 pertaining to the closed block is left in the table but marked invalid and removed from the lookup path. The consequence is that by the end of compilation for an application source module 12, its entire symbol table 56 is removed from the lookup path and all information is marked invalid, which is the correct starting situation for later reuse.

Other journals are needed for some languages. Incremental preprocessing for macro expansion is one example.

The saved information, mostly in journals, is attached to a context associated with a single application source module 12. Each module 12 has its own set of journals. The compiler 11 is instructed to set its context to the proper information prior to any use of that information. During compilation the information is checked and usually changed to some degree. During linking the information is accessed to find and set addresses that cross application module boundaries. The RCASE command to the compiler is SetContext; it can be issued at any time that RCASE is in control.

The saved information is the substance of the checkpoint files written upon command from the developer. The restart entry of RCASE is a special way to enter the environment so that all state is restored to RCASE and its attached components, restoring the situation so that the developer can continue where work was left off prior to the previous checkpoint operation. Not all useful information need be saved at checkpoint; but rather only that information that cannot be recreated, or is too expensive to recreate upon environment restart. This involves engineering tradeoffs that are dependent on the details of the application language, the structure of the incremental compiler and the various performance factors of the host system and its backing store.

In addition to compiling the individual source text files into executable code, the compiler must also link the executable code files. In RCASE, this linking is unique in that it is done in such a manner as to retain the module boundaries between executable code files that originate in the original modular structure of the source text.

This linking is done in RCASE in memory through the use of pointers to point to the "absolute", that is, actual memory, addresses of the code to be linked rather than to file-related addresses. RCASE uses internal tables to identify the "ends" of each link, that is, to identify the points at which addresses are to be inserted into the compiled code and where in the compiled code each address is to point to.

It is common experience in system programming that link time for several modules is approximately the same as compilation time for one module. The consequence for batch compilers is that even if either compiling or linking alone were instantaneous, the other would limit any gains in turnaround to 50% speedup. The consequence for RCASE is that linking must be speeded up as much as compiling for any gains to be realized. Existing incremental linkers operate under two constraints which limit the available improvement: 1) the result of linking is placed in a file for later activation, costing both the time to format the information and the file write time; furthermore the file must be designed so that it can be incrementally changed; and 2) when an application source module is changed, an entirely new object module is produced by the compiler, thus all of its supplied information must be distributed throughout the compiled application as well as the information from the rest of the application being supplied back to the changed module.

An RCASE incremental compiler avoids changing either the supplied address or addresses of places needing external values. This action is, in fact, largely a byproduct of the fine-grain incremental routines employed to speed up recompilation. Therefore when a recompilation takes place, the number of places needing correction may be none at all, or perhaps only a few. The best case for conventional incremental compilers (whole module changes) is the worst case for RCASE. The incremental compiler 11 must supply additional information to the incremental linker 15 to activate this saving (See FIG. 6a). Each entry 57 in the local link table 58 for an application module 12 has, in addition to the traditional NEED/DEF fields, a field 59 giving the incremental status of the information—"new", "old", or "deleted". The incremental linker 15 updates both ends of "new" information and removes "deleted" entries 57 from its own tables.

There is, as in the case of maintaining the cleanlines table 50, an alternative method of keeping the tables 58 of the incremental linker 15 correct. The incremental linker 15 can supply entries through which it can be notified of changes by the compiler 11 so that they can be dealt with one at a time during compilation.

As described above, the editing of source text will require the recompilation of at least the changed portions of the text. It is frequently the case, however, that a change in one module 12 of source text will be reflected in other modules 12 of the source text that have not, in themselves, been changed by the editor and these dependent modules of source text must also be recompiled and relinked. In the prior art, this has usually been handled by either assuming that all of the text must be recompiled or by examining a developer-prepared dependency file (often called a makefile), and then consulting the file system time-of-last-write data for each file to insure that each dependent module has a later time-of-last-write than any module upon which it depends. Modules that fail this test are then recompiled in order of least dependent first. The prior art has three deficiencies that are corrected by the features of RCASE: 1) the developer-prepared makefile must be correct for the dependency analysis to be reliable—as changes are made during development it is common for the makefile to become incorrect and for the developer to fail to correct it, 2) the developer must plan for the worst case in preparing the makefile, often causing unnecessary recompilation, 3) the smallest unit for which the developer can express dependencies is a complete application module where in fact changes are nearly always to a small part of such a module.

In contrast, according to an incremental dependency analysis feature, RCASE generates and stores fine grain dependency graphs 60 as seen in FIG. 6b identifying in field 61 dependencies between symbols within the application modules 12, and in field 62 the times of last change to each given application source module 12. RCASE may therefore, at any time, from graphs 60, identify all changed sections of source text and those portions of source text that are dependent from a given section of source text that has been changed. The automatic generation of dependency information from the application source modules 12 relieves the developer of the need to express and maintain the dependency information in the makefile, and in addition increases reliability by eliminating a source of developer-introduced error. This feature in turn substantially decreases the time required for recompilation by allowing the identification of only those portions of text that must be recompiled because of a direct change or a dependency from a changed section of code without complete recompilation or computation of the dependencies. It is rarely necessary to recompute the dependency graph 60 unless the changes are of such magnitude as to substantially modify the organization of the modules 12 of the source text, which is a relatively rare event.

It is common problem in software development that, due to the magnitude and complexity of the information involved, the shutting down and restarting of work on a project, for example at the end of the workday or in the event of a system failure, is normally quite time consuming. In addition, if certain processes are not completed when shutdown occurs, certain information and a certain amount of work may be lost. This disadvantage arises in the usual software development environment because the relevant information is saved and restored in the form of standard files, much in the same manner, for example, as a document is saved when an editing session is ended. Information is lost if the file has not been recently saved, or if it is the nature of the environment to keep the file in a temporarily unrecoverable state during the execution of the environment.

In RCASE, as previously described, the entire process, including all data being worked upon, such as source text and compiled code, the editors, compilers and so forth in use, and the process information are always resident in virtual memory. Taking advantage of this, RCASE includes a "suspend" command which saves the relevant states from each module in memory to a file and then reports the file name to RCASE upon termination of a session. RCASE saves the list of filenames in a single file. Operation may then be resumed by a corresponding "restore" command, with the entire state being returned from the single file. It has been found that this approach results in very substantial savings in the time required to shut down and restart work because the intermediate state of RCASE can be saved in addition to the normal file products. It is this intermediate state that is so expensive to restore. In addition, the user sees exactly the same state upon restart as at suspend, thereby saving the time and energy normally required for reorientation after restart.

Figure 7:
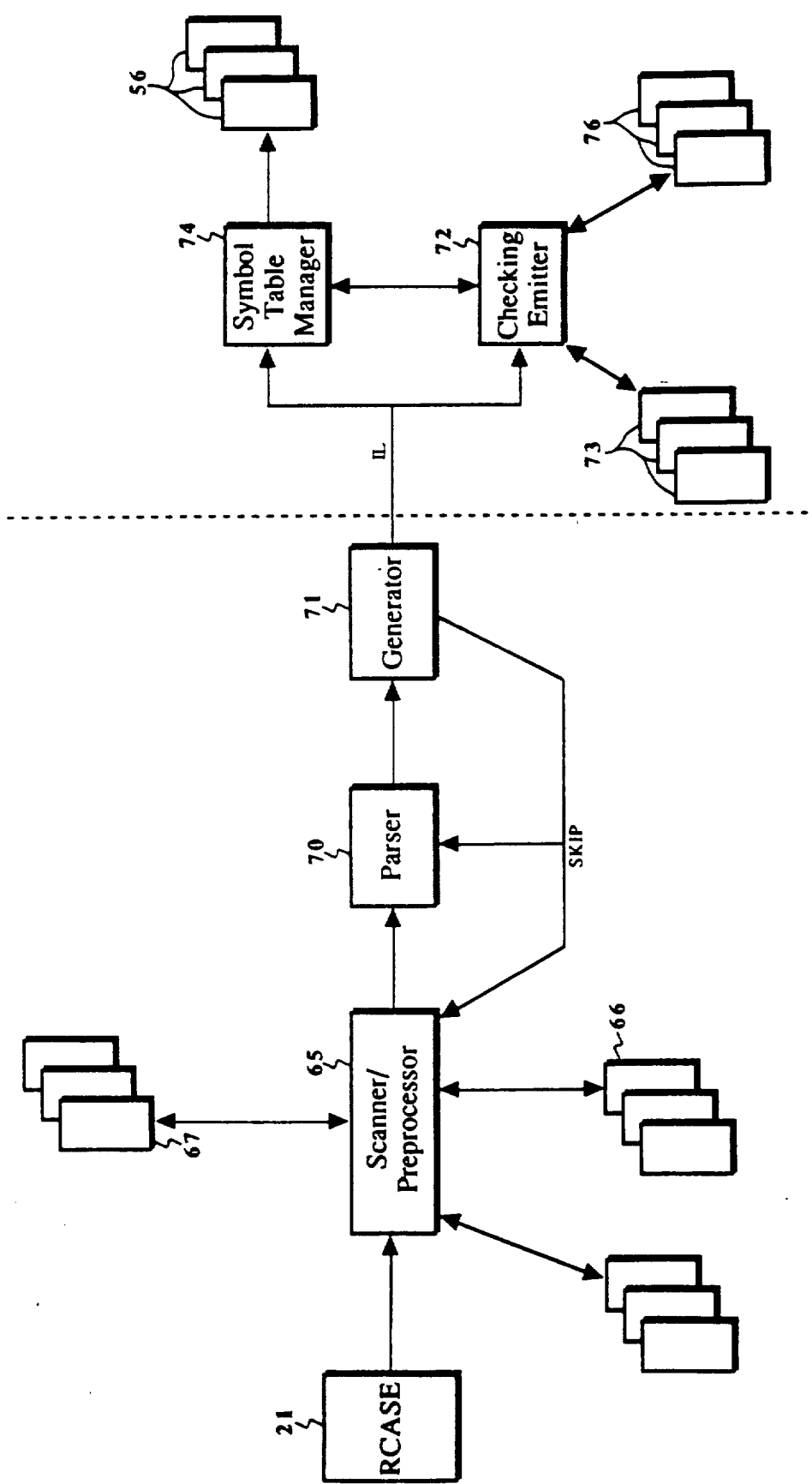
FIG. 7 is a diagram of the general structure of the front and back ends of an incremental compiler designed according to one embodiment of the present invention.

Referring to FIG. 7, a diagram of the incremental compiler 11 is illustrated. The front end structure of the compiler includes a scanner 65 which receives the source text (via RCASE from the editor) and the cleanline increments, and generates token tables 66 and lexical increment tables 67, as will be described. A parser 70 receives the tokens from the scanner and passes filtered tokens and rules to the code generator 71, which, for executables, via emitter 72 produces increments of object code maintained in code increment tables 73, while, for declaratives, symbol tables 56 are produced and maintained via symbol table manager 74.

The following is an architectural description of the structure for an incremental compiler 11 to be supported by RCASE, according to one embodiment. An incremental compiler supporting RCASE will have the following characteristics:

For shared modules between batch and incremental compiler:

(a) Provide for reusable front end modules (scanner 65, parser 70, and possibly the generator 71) that can be shared by both the batch and incremental versions of the compiler. This enforces some degree of source language consistency between batch and incremental environments.

(b) Be structured so that its reusable modules can be, and are, tested standalone.

(c) Support a callable interface to an incremental version of the compiler.

The front end internals must:

(a) Support the ability to generate and reuse lexical increments.

(b) Support skip-scanning, the ability to stop the scan at standard points and restart it as though it had scanned the intervening source lines.

(c) Use a token interface between its scanner 65 and parser 70.

(d) Specify a standard context-free grammar for its language.

(e) Support skip-parsing, the ability to stop the parse at standard points (e.g., begin-of-statement) and restart it as though it had parsed the intervening tokens.

(f) Use a "token+rule" interface between its parser 70 and generator 71.

(g) Support the ability to generate and reuse semantic increments.

(h) Support an incremental symbol table 56.

Journalling:

(a) Journalling technology is used to check the validity and perhaps reuse previously generated information (such as token tables 66, generated code of tables 73, symbol tables 56, etc.)

Context switching and checkpointing should be provided to support:

(a) State-saving and context switching of journalled information.

(b) Checkpointing of journalled information to a file for reuse upon restart.

Memory management must be provided to:

(a) Avoid trashing by allocating memory for journalled information on a per-source buffer 12 basis.

An overview diagram depicting the context in which an incremental compiler 11, according to the present invention, resides is shown in FIG. 6. In this diagram, the editor 10 manages multiple source buffers 12 and provides source text to RCASE 21. RCASE interacts with the editor 10 to identify the source lines in a given buffer that have been modified since the last time they were processed by the compiler 11. RCASE presents an abstraction of the source buffer 12 called cleanline increments to the compiler 11. Cleanline increments allow the compiler 11 to determine if it can reuse saved information it had generated in a previous compile-session of the same source buffer 12. If not, the compiler 11 can obtain the text for the appropriate source lines through RCASE 21 to generate the necessary information which can then be reused in the next compile-session.

The output of the compiler 11 is a code-data-symbol buffer 14 that contains all the necessary information required by the incremental linker 15. For each source buffer 12 that is incrementally compiled there is a corresponding code-data-symbol buffer 14 for it. The code-data-symbol buffer 14 is in fact organized as a collection of independently allocated and managed areas in virtual memory 37 and is retained only in virtual memory until such time as the developer requests a checkpoint.

RCASE is designed to support multiple languages so at any given moment there may be more than one compiler 11 active in the environment. Every time RCASE receives a request to compile a source buffer 12, it must determine if the appropriate compiler has been activated. This requires that incremental compilers 11 support the RCASE callable interface so that RCASE can make them available when necessary.

FIG. 7 contains the general structure of the front end of RCASE incremental compiler 11. The source lines and cleanline increments come from RCASE. The scanner and preprocessor 65 together produce a sequence of tokens which refer back to the token tables 66 via access functions for detailed information. The parser 70 discovers the sequence of grammar rule applications to construct the canonical parse. The generator 71 produces the intermediate language (IL) and sends it to the back end structure. The lexical increment table 67 contains journalled information for saved-state in the scanner 65. When a lexical increment is reused, skip-scanning occurs.

It is desirable for a batch and incremental compiler 11 to share the code for the scanner/preprocessor 65 and parser 70, and maybe the generator 71. It is unlikely that any other modules can be shared for the finest grain incremental compilers.

FIG. 7 also contains the structure of the incremental back-end. The incremental back end receives the intermediate language (IL) from the front end. The IL is delivered either to the symbol table manager 74 or to the checking-emitter 72. The symbol table manager 74 constructs and updates the incremental symbol tables 56. The checking-emitter 72 accesses the symbol table 56 when necessary, and generates unoptimized checking code which is managed in the code increment tables 73 and semantic increment tables 76.

The checking-emitter 72 trades off target-code quality for rapid turnaround. The emitted code is generated in increments which are independent of the code for surrounding increments, at the cost of preventing cross-statement optimizations, and at the gain of enabling incremental update. The checking-emitter 72 also adds checking code for bounding memory access, detecting aliasing and uninitialized variables, and so on.

In FIG. 6, the final product of the compiler is described as a code-data-symbol buffer 14. Logically, a single code-data-symbol buffer 14 is the composition of the corresponding symbol table 56 and code increment table 73. There is a procedural interface that enforces this logical view which is used by the RCASE incremental linker 15.

As shown in FIG. 7, the main job of the scanner 65 is to convert its input of cleanline increments and source text into a sequence of tokens for the parser 70. The scanner 65 is able to perform this task so that it only needs to actually scan the line if the line has just been created or modified. This capability is implemented using a data structure called a lexical increment. The scanner 65 also supports the ability, called skip-scanning, to skip-ahead in the input source-line stream. In addition, the scanner 65 hides the physical layout of the representation of tokens from the rest of the compiler 11, by communicating through a token interface. All of these concepts are described below.

A cleanline increment is an abstraction presented to the scanner 65 by RCASE. It can answer the question "How many unmodified source lines follow the current line?". This is useful information since RCASE incremental compilation is based on journalling effects of multiple consecutive lines of text (lexical and semantic increments). When the answer is "The needed text has been modified," then RCASE provides access to the raw text in the editor 10.

Typically a line of source text can be scanned by itself. The compiler-significant content of a line is a sequence of tokens. In unusual cases, such as Fortran "CONTINUE" or C end-of-line override " ", several lines must be scanned as a unit. The lexical unit of one or more lines is called a lexical increment. The use of a lexical increment is to record and later hand off successive tokens to the parser 70. A lexical increment provides the following capabilities:

Check( ): performs various validity checks such as whether or not the current set of consecutive source lines associated with this lexical increment have been modified (or in some other circumstances having to do with context-dependence of token structure which must be checked outside of the scanner mechanisms). It uses cleanline increment information to perform some of its checks. It returns TRUE if the validity checks succeed.

ScanIncrement( ): creates a new lexical increment. It consumes as few complete lines as possible, starting at the first line it is given, to build a valid lexical increment. Its value is the number of lines actually consumed (rather than the number inspected). By checking after application of ScanIncrement( ): it is possible to find out if building this lexical increment invalidated the next one (by invading its territory or leaving a gap).

context to the location of the first token in its token list.

NextToken( ): is an iterator that updates the lexical increment's current context to the location of the next token in its token list.

Token( ): returns as its value the "handle" for the current token (handles are defined when the token interface is described). A null-handle value is returned when the end of the list is reached.

Figure 9:
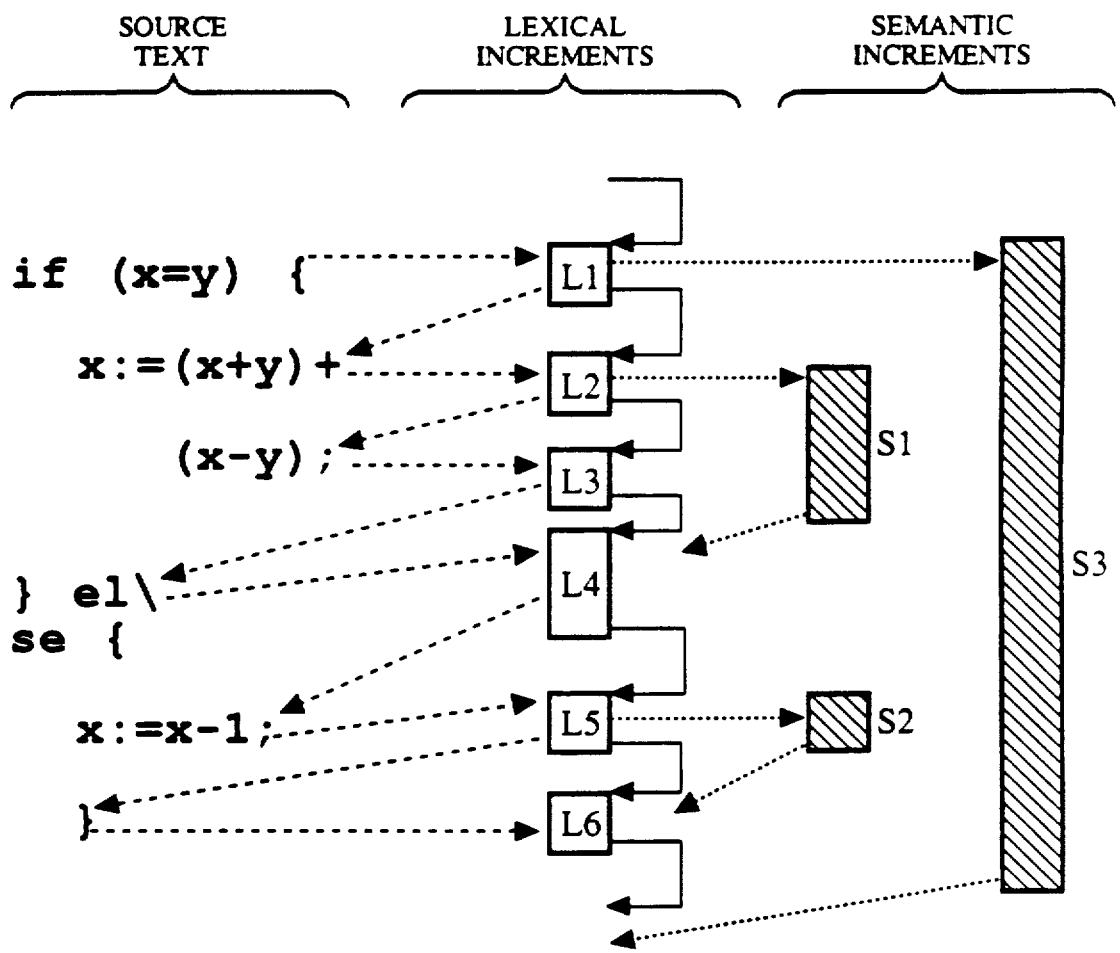
FIG. 9 is a diagram of the source text, lexical increment, and semantic increment relationships in operation of the compiler of FIG. 7.

As indicated in FIG. 7, lexical increments are organized in tables 67. Every source buffer 12 that is compiled has a lexical increment table 67 associated with it. A lexical increment table 67 also has various capabilities defined to add, delete, iterate, and update its entries. FIG. 9 illustrates the relationship between source lines and lexical increments.

The motivation behind the design of the lexical increment is that Scan-Increment( ) need only be applied when the corresponding text has been changed. The saved scanned tokens of the lexical increment is the basis for incremental scanning with its corresponding speedup of compilation, both because of the saved CPU time and also because of the potential saved page faults in not accessing the text.

Skip-scanning is the ability of the scanner 65 to stop the scan at standard points and restart it further down in the source text as though it had scanned the intervening source lines. This action must be applied when a lexical increment from table 67 is reused so that the scanning context can be updated to the appropriate position in the source text that follows the last token of the reused lexical increment. This action must also be applied when semantic increments from tables 76 are reused since its associated lexical increments are indirectly reused. As long as the scanning context is maintained, the scanner 65 will know where to start scanning when a new lexical increment needs to be generated.

The token interface is used by the scanner 65 to hide the physical layout of the storage of tokens from the rest of the complier 11. This strategy allows the scanner 65 to hide the details of how it supports state-saving and check-pointing of tokens. It also encourages the construction of a reusable scanner-module (batch vs. incremental) because of the resulting simplified interface between the scanner and the rest of the compiler 11.

The main technique applied in the token interface is the use of a "handle" to identify a token. A handle is, in the simplest case, an index into an array of structures private to the owner of the information, each array element describing a unit of information. Access to the information is provided by a procedural interface provided by the owner. More complex encodings of handles are sometimes chosen for engineering reasons, principally for efficient implementation of the access functions.

So in FIG. 7, all occurrences of tokens being exchanged by the scanner 65 and the rest of the compiler 11 are really the handles for tokens. When information on a token is required, the other parts of the compiler 11 use the handle and the access functions of the token interface.

The scanner 65 deals with the transformation of raw text into tokens. The first step is to discover the lexemes. The lexeme must then be associated with the corresponding structure from the language. For some languages this is a trivial mapping; for others with macros or keyword features, it may require a computation and other tables.

Figure 8:
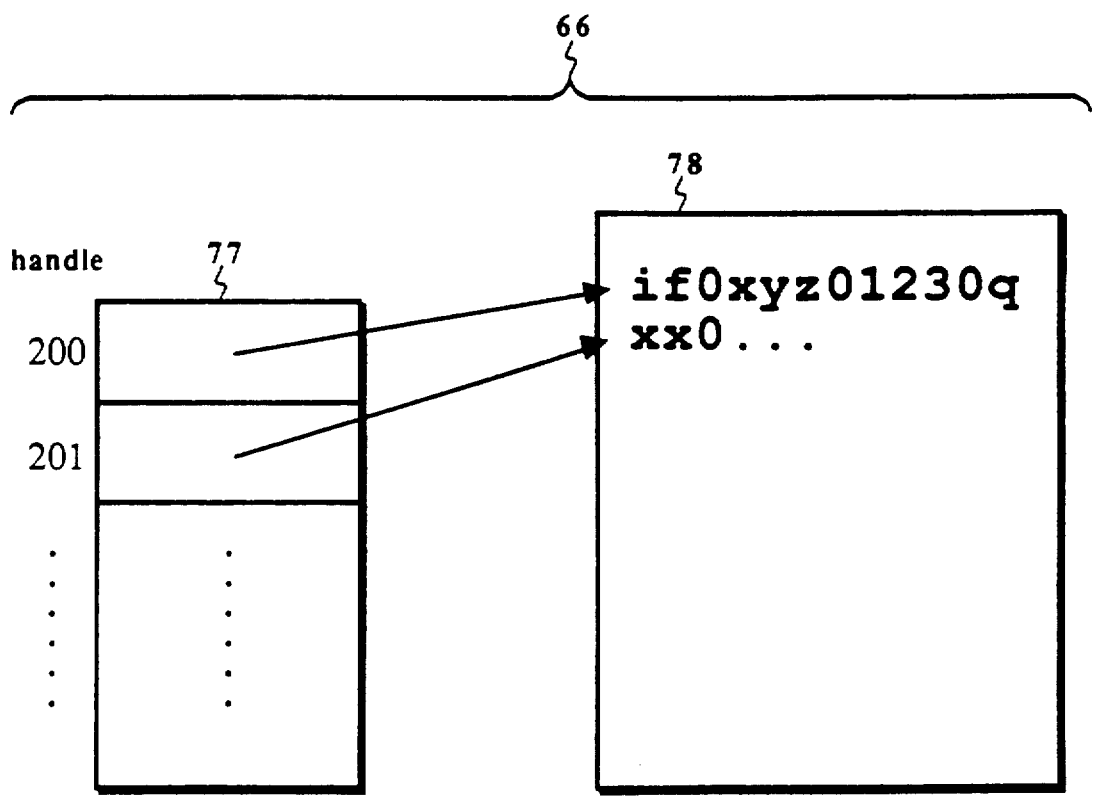
FIG. 8 is a diagram of the structure of a token table generated in the compiler of FIG. 7.

FIG. 8 shows the structure of a token table 66. A lexeme is the unit of information in source text. The only distinguishing feature of a lexeme is the text composing it. The number of unique lexemes is less than the total number of lexemes in the source text. This property is exploited in compilers designed to function within the RCASE environment by tabulating unique lexemes, permitting comparisons on the table indices (i.e. handles) rather than on the text characters. The tabulating object is a lexical table 77. The strings are packed away (assume null-terminated ASCII format for the moment) in a non-collectible heap referred to as the string table 78. The lexemes are indices into the heap or string table 78. The lexical tables 77 are allocated one to a source text buffer 12 to avoid thrashing.

The job of the parser 70, as shown in FIG. 7, is to report a sequence of grammar rule applications—the so-called canonical parse. The scanner 65 is simultaneously reporting a sequence of tokens to the parser 70. It is the complete sequence of tokens that drives the parser 70. These two sequences contain everything that must be known by the rest of the compiler 11.

An incremental parser 70 can perform this job and provide the additional capability of only re-parsing portions of the token-stream that have been modified since the previous compile-session. This capability is known as skip-parsing.

It is feasible to construct a context-free grammar for a programming language. As it happens such context-free grammars describe all legal programs and some illegal programs. These illegal programs must be detected by other mechanisms in the compiler. It can be required, in addition, that the grammar is LALR(1), and that it reflects the semantics of the language as defined by the batch and incremental compilers. Any grammar successfully used as input to a LALR-based compiler meets this requirement.

For use in the RCASE environment it is required that a context-free grammar be constructed for each programming language. This constraint does not require front ends to use a LALR grammar processor—the canonical parse can be generated with recursive descent techniques as well.

The following sections describe skip-parsing and use of the token-rule interface between the parser and the generator.

Skip-parsing is the ability to stop the parser 70 at standard points (e.g. begin-of-statement) and restart it as though it had parsed the intervening tokens. This is implemented differently depending on the type of parser used (recursive descent or LALR). A recursive parser skips a designated increment by not calling the corresponding parsing function (see the discussion of semantic increments below for details on designated increments). A table driven parser skips indirectly by providing a service which updates the internal state of the parser to carry it from before-to-after for the designated increment. Skip-parsing is invoked from the generator 71 in both cases.

When skip-parsing occurs, semantic increments from tables 76 are re-used in place of computing the semantic actions for the skipped tokens and rules. The reuse of semantic increments (made possible by skip-parsing) contributes significantly to the speed-up of the compile-time turnaround. Note, skip-parsing implies skip-scanning as well.

The token-rule interface enforces loose coupling between the parser 70 and generator 71. Minimizing the dependencies between these two components facilitates the implementation of skip-parsing, and the construction of reusable parser and generator modules. In addition, the token-rule interface hides the detail on the type of parser 70 being used from the generator 71.

A large proportion of token and rule sequences can be filtered out for efficiency reasons prior to semantic analysis because it has no semantic content. Specifically, the tokens with content, meaning identifiers, constants, and strings, are passed on by the parser 70 to the generator 71 with, or just prior to, passing the rule that includes them so that the semantic routines get the content they need. Similarly, only the rules with content are passed from the parser 70. In the generator 71 one typically finds a (very large) switch, one entry for each content rule. The generator 71 passes a sequence of semantic actions on to the back end.

From the recursive descent viewpoint, it means that the recognizer behaves much like its LALR counterpart and does nothing except emit content tokens and rules. From the generator viewpoint, it means it does not matter whether a recursive or LALR parser is being used, or both, or even a mixture.

The job of the generator 71, as shown in FIG. 7, is to pass on the IL, which among other things contains the sequence of semantic actions (emitter and symbol table actions), to the back end. The generator 71 is implemented as a large switch. In each case the appropriate call is made to the back end. When certain conditions arise, the generator 71 will invoke skip-parsing to reuse a semantic increment and thus save time in the back end generating code.

Regarding the requirements for the back end of an incremental compiler 11, the back end modules are not to be shared between the batch and incremental versions of the compiler. Batch compiler writers should not be concerned with the specifics of the incremental back end. The job of the back end is to produce the input for the incremental linker 15. It performs most of this job by producing and reusing semantic increments of table 76 and manipulating an incremental symbol table 56.

The semantic content of part of a source module 12 is recorded in a semantic increment (in table 76). The boundaries of the semantic increment correspond to semantic units in the source language (for example, a semantic increment may be as assignment statement). Because the semantic units of modern programming languages nest, so also do semantic increments. A semantic increment provides the following capabilities:

Check (), insures that the precomputed state of the semantic increment is consistent with the state of its surroundings. Check ( ) never has any side effects.

Compile ( ), computes the effect of this increment, both in terms of symbol table access and the production of executable code. This is called when Check ( ) returns a failure status. The task of compile is to record the effect in the semantic increment tables if possible, and otherwise leave it to be executed without the incremental capability. In this last case Compile( ) reports a failure to build an increment so the following function, Apply( ) will be able to return immediately to the compiler proper without attempting an application.

Apply( ), insures that the effect of compiling the increment is applied. Apply( ) is called after Compile( ) when Check( ) fails.

The RCASE environment requires separation of code implementing parsing and semantic actions. The means is restriction of the parser 70 to the production of the canonical parse and associated lexical information. This requirement enables skip-parsing when recompilation is not necessary. For any particular programming language there will be a set of "designated increments" supported by RCASE. For example, the set might include assignment statement, declaration, conditional statement, and function definition. RCASE requires that the incremental compiler 11 produce disjoint executable code for disjoint designated increments. This disjointness property enables incremental semantics. Nested increments do not need to be disjoint, of course, but they do need to start on a application source line that is unique to the increment. That is, even nested increments cannot start on the same line.

The relation between the various levels of abstraction is (perhaps deceptively) simple. The raw text is maintained by an editor 10, it is chunked into scannable objects (lexical increments of tables 67) by the scanner 65 of the compiler. Any contiguous sequence of lexical increments may fall within the scope of a semantic increment. Semantic increments always properly nest, and further, never share a first lexical increment. This latter is partly an artifact of programming language design (something new always starts with distinctive syntax) and partly a concession to implementation convenience, since it is necessary to associate saved state with unique application source text lines and therefore inconvenient to have to save two lines of information in association with one line (see FIG. 9).

Figure 9A:
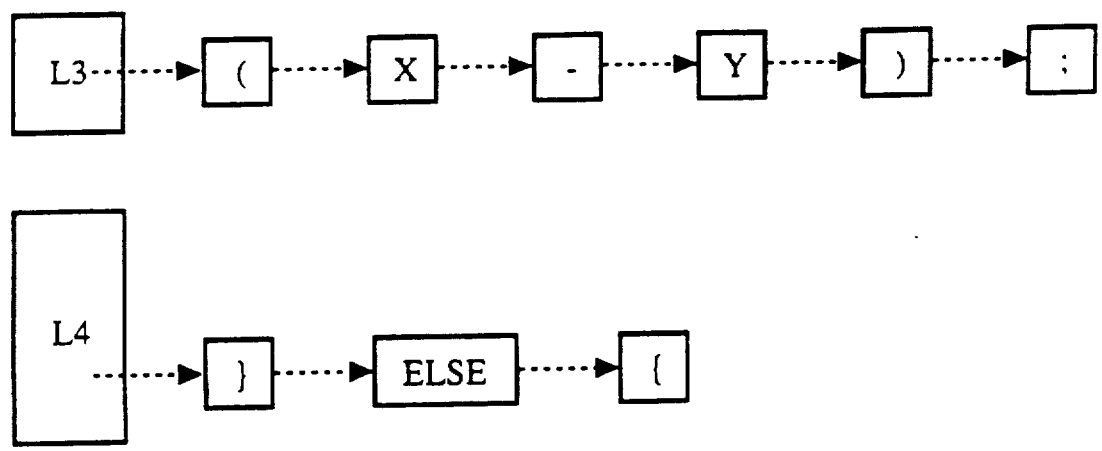
FIG. 9a illustrates the token handle list contents for two of the lexical increments illustrated in FIG. 9.

The example in FIG. 9, shows a section of a source buffer 12 containing a C program. Note, even though the first assignment statement $$x := (x+y) + (x-y)$$

spans multiple lines, each line is separately scannable so a lexical increment is created for each of its lines (L2 & L3); a semantic increment S1 is formed by this statement. However, the "ELSE" clause uses C's override character "\" to span multiple lines which results in each of its lines not being separately scannable. In this case, a single lexical increment is created to contain all the lines required to scan this particular construct (L4). FIG. 9a illustrates the token handle list contents for the lexical increments L3 and L4 (the tokens are entered into the token table 66, the lexical increments into table 67).

Figure 9B:
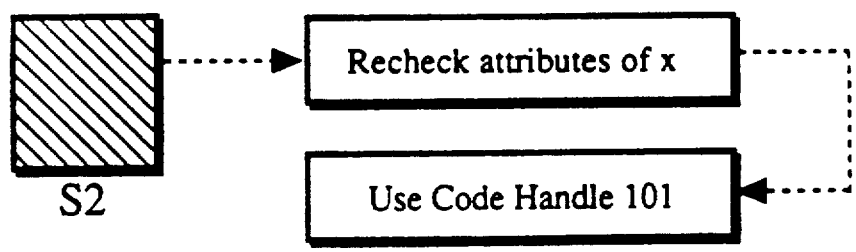
FIG. 9b illustrates the contents of a semantic increment table.

The designated increments supported by semantic increments in FIG. 9 are assignment (S1 and S2) and if-else constructs (S3). FIG. 9b illustrates the contents of a semantic increment.

A semantic increment is either a set of effects on emitted code or the symbol table 56; the symbol table 56 is described below. The executable effect of a semantic increment (such as S1, S2 or S3) is the code that is generated for it. Referring to FIG. 9b, an entry 85 in the semantic increments table 76 includes a identification 86 of the semantic increment, the validity checks 87 that need to be run and a field 88 to identify the code increment that can be reused if the checks are passed. In the case of S2 the validity checks are: the line containing the source code has not been modified, and the attributes of variable x are unchanged. In this case the effect is to reuse the saved code designated by handle 101. It is important to emphasize that the semantic increments can be nested to arbitrary depth; the consequence is that longer increments of the saved state can be reused for the same constant overhead that each smaller increment would require—this is a major determinant of the speed of the system of the invention, and one that is unique. That is, the contents of the semantic increment in the semantic increment table 76 are checks for validating it and a handle into a code increment table 73. A code increment table 73 contains fragments of executable code. Each is contiguous, perhaps in need of some fixup addresses, but otherwise ready for the CPU.

When a semantic increment is reused, the code generation phase for it is skipped by reusing the code fragment from table 73. Much (or all) of an execution image in RCASE is carried out within the code increment tables 73.

Figure 9C:
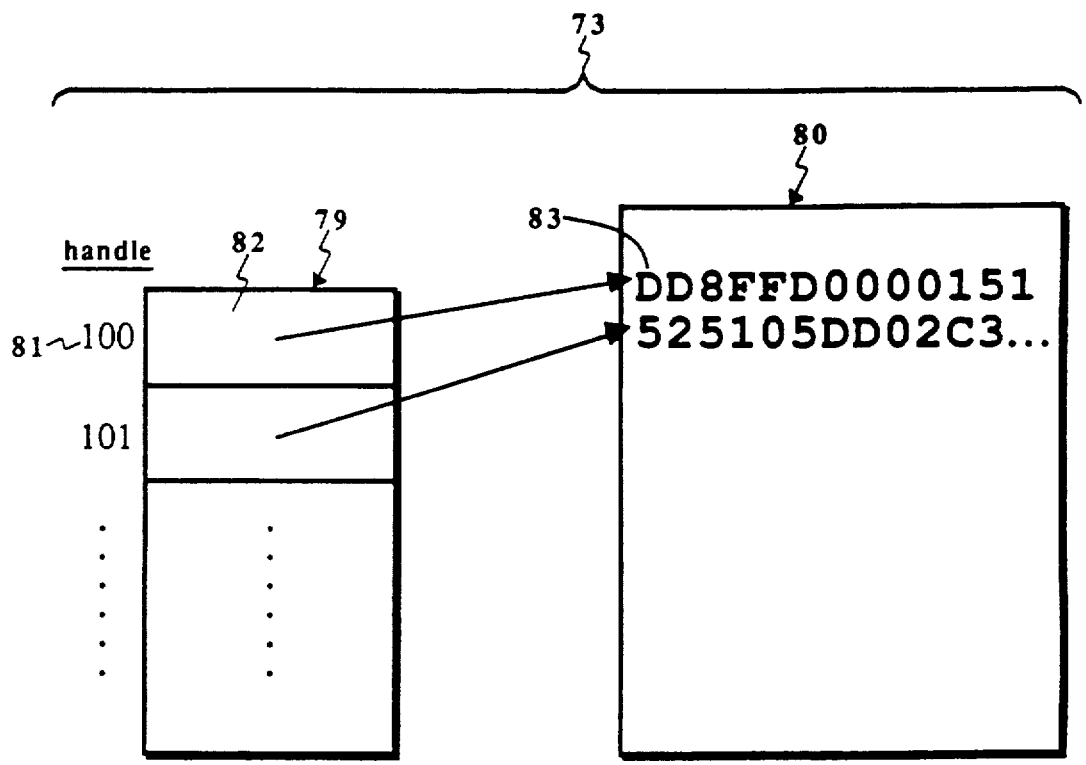
FIG. 9c illustrates the organization of a code increment table corresponding to increments of FIG. 9.

FIG. 9c illustrates the organization of a code increment table 73. A code increment table 73 is actually composed of two sub-tables. The code index table 79 contains information for managing the code fragment table 80. A semantic increment S1, S2, etc., contains a handle 81 to access an entry 82 in the code index table 79. From a code index entry 82, a code fragment entry 83 can be derived. A code fragment entry 83 contains an executable code sequence.

All code emitted by incremental compilers 11 is self-checking for array and pointer bounding.

A symbol is a name used in the source program together with all the information necessary to interpret its use in the program. The traditional mechanisms for associating the occurrence of a name with a particular symbol is a symbol table or decorated abstract syntax tree. Because of contextual interpretation (such as scope rules in C, or position of definition in Fortran) each symbol name must be interpreted within context. Thus, information about each symbol may include the symbol's name, its data type, usage (e.g., procedure, variable, or label), its address, etc.

A conventional symbol table is accessed via methods which enter, check and retrieve information. An incremental symbol table 56 must behave conventionally but also save information for reuse across scope closure, and even end-of-compilation. An implementation consistent with RCASE is to provide a warm/cold (validity) bit on each individual item of information (or atrribute), the symbol as a whole, the local scope as a whole, and the symbol table as a whole.

For use in RCASE the symbol table 56 must include more specific information than typically found in batch compilers. In particular, absolute storage addresses are allocated to global variables.

Figure 7A:
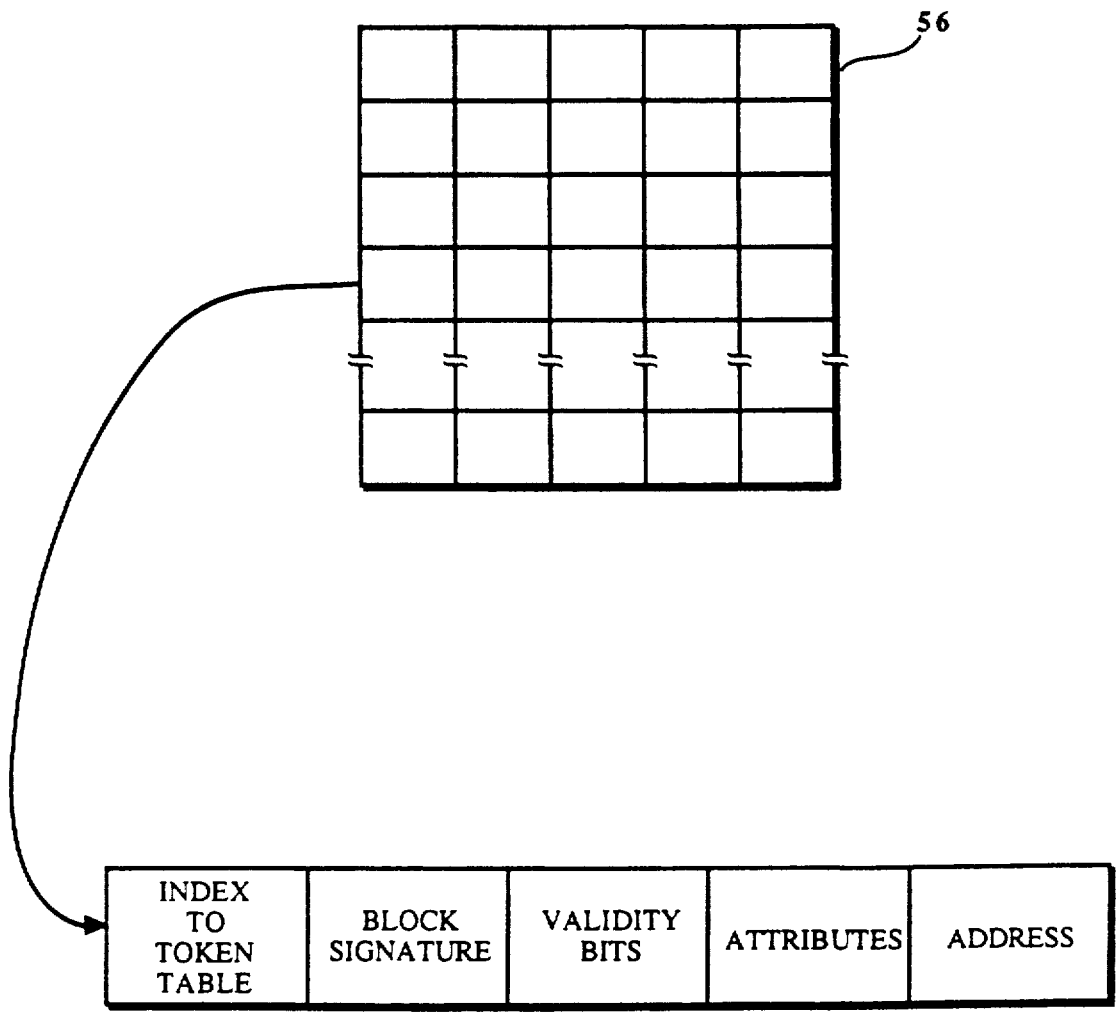
FIG. 7a is a diagram of a symbol table and symbol table entry generated by the compiler of FIG. 7.

Referring to FIG. 7a, the fields for an entry in an incremental symbol table 56 are illustrated in accordance with one embodiment of the present invention. The first field contains an index to the token table where the symbol name has been stored. The block signature field is used to define a context frame. The context frame serves the purpose of limiting the scope of a name so that the same name can be used in a different context for a different purpose without the reference to the name becoming ambiguous. Consequently, different procedures can define and use the same name in different ways. The validity bits, attributes, and address fields have been discussed previously.

When a new compilation of an application source module is begun, the fully developed symbol table 56 from a previous compilation is present, (valid information is never discarded from the symbol table 56), with all validity bits set to false. The cold items can then be warmed up (i.e., the validity bit is set) and reused during recompilation. For example, as the compile progresses, symbol names and associated information are generated. But before this information is entered into the symbol table 56, the table is checked (via a journal action) to determine if that information already exists within the table from a previous compile. If a particular name already exists in the symbol table, its validity bit is set to warm and inquiries are made to determine if its attributes are the same as they were after the previous compile. If an attribute is unchanged, its validity bit is set to warm. This process continues until an attribute is found that has changed or until a new entry is found. Once this happens, everything that depends on the changed or new information must be recompiled. However, up to this point, the compiler can skip over the clean or unchanged increment without recompiling code unnecessarily. The clean increment does not need to be parsed because the information that would result from the parse was saved during the previous compile and can now be re-used. To further increase speed and efficiency, as mentioned before, memory for a symbol table 56 is allocated contiguously for a single source module 12 to avoid thrashing.

Journalling is an important feature. The underlying technique of incremental compiling as herein discussed is selective journalling of interactions across the interfaces between modules of the compiler 11 of FIG. 7. Whenever the compiler 11 can record its response to a chunk of input as a sequence of actions, there is potential to play the actions out rather than recompute them. This is especially attractive when the former is many times faster to perform than the latter. The simplest example is the result of scanning a line of text. The journal is the sequence of tokens that is associated with the corresponding source text. The token list is saved within the scanner 65 in lexical increments in table 67 (also seen in FIG. 9a) and tokens are returned, one at a time, on demand, to the parser 70. The journalling is implemented on two levels. Token handles are saved in the lexical increment's token list. Token details are saved in the token tables 66. Information on a given token can be accessed from the token table 66 using the token handle.

Another example of a journal is the semantic increment table 76. Each semantic increment journals its effects on the symbol table 56 or emitted code of table 73 (including information on how to validate itself). Associated code is journalled in code increment tables 73, and its location is represented as a handle in the semantic increment. There are many other potential candidates for journals. The choice of implemented journals is up to the individual compiler, based on an analysis of the cost/benefit of each journal.

The limitation on this technology is that the increments can only be associated with line-blocks of text and the journalling must be sufficiently simple to make the playback (much) more efficient than recomputing the effect. There is no expectation that every speedup will in fact be cost-effective.

Journalling is more effective when the actions record activity across a concise and well-defined interface.

Each journal is valid under a set of language-specific conditions, checks for which become part of the journal. One universal condition is that the corresponding source text of module 12 has not changed, information which RCASE 21 provides to the scanner 65 of the compiler 11 through cleanline increments from tables 50.

A journal can be optimized for a given increment of source text. For example, where a traditional compiler might repeatedly look up an occurrence of a variable in the symbol table 56, the incremental compiler 11 can look it up once, insure that the previous attributes have not changed, then accept all actions relevant to the variable for the entire increment without further checking. For an "if" statement, once the variables have been checked for validity, the final target code can be played back as a single action rather than as a series of smaller emitter and fixup actions.

The use of journalling entails the following responsibilities:

(a) the producer of the journal must provide all the necessary access functions to manipulate its journal entries (create, delete, validate, iterate, etc.).

(b) each journal must be allocated on a per-source-buffer 12 basis to avoid thrashing.

(c) a journal should provide check-pointable handles to its entries.

(d) a journal entry should only be interpreted through the access functions provided by the journal producer.

Context switching and checkpointing is another feature of importance. In a session, the developer will compile many different source buffers 12. Since RCASE requires than an incremental compiler 11 be callable, it will be able to manage the processing of multiple modules. The incremental compiler 11 must be capable of saving information, hiding that information while switching context to a new module 12, and then uncovering the saved information when the context is switched back. This in turn implies that all of the internal modules of the incremental compiler (e.g. scanner 65, generator 71, emitter 72) must be able to support context switching of their respective saved-states (e.g. lexical increment tables 67, semantic increment tables 76, etc.).

To support context switching, incremental compilers 11 must support the following capabilities accessible to RCASE:

SetContext(h): where h is a "context handle", allowing the callable compiler 11 to save state for more than one compilation unit at a time, and switch between contexts on demand. The current context affects the memory allocation scheme as well as defining the meaning of compiler-supplied services such as Checkpoint( ).

For example, consider the table 66 describing token values. There may be more than one module 12 being processed by the environment. The scanner 65, in addition to saving the token values, must be able to reveal and conceal a particular token table 65 upon receiving a request to SetContext(h) for context h.

In addition, RCASE provides session-support to allow the developer to save the current environment and resume it at a later time (checkpoint/restart). This requires each compiler module to be able to write its saved state to a file, and read and restore the same saved state. This requirement suggests an implementation that does not use machine addresses within, or to describe saved information (e.g. handles).

To support checkpoint/restart, incremental compilers 11 must support the following capabilities accessible to RCASE 21:

Checkpoint( ): this entry activates the compiler's checkpoint facility which will record onto a file all the relevant state information for the current source module 12. The return value is the pathname for the checkpoint file (note: SetContext() is used to iterate through multiple modules 12).

Restart(n): where n is the pathname for a checkpoint file, activates the compiler's restart facility which will restore all the data structures required for incremental compilation from the contents of the checkpoint file. Typically Restart is invoked from the operating system command line that activates RCASE rather than from within RCASE as indicated here.

In addition, RCASE will supply to the compilers 11 the following capabilities for generating unique checkpoint file names:

ModuleName( ): returns the name of the current source module 12.

ProjectName( ): returns the name of the current project.

The incremental linker 15 receives as its input the code-data-symbol buffers 14, which as explained above include the symbol tables 56, code increment tables 73, link tables 58, etc. The linker 15 is incremental in the sense that increments from the code-data-symbol buffers 14 which have not been changed since the previous linking operation, and are not dependent upon changed elements, are reused. One of the features which allows the incremental linker to operate much faster is that the code-data-symbol tables 14 are in virtual memory rather than being in files; all of the complexities of file systems and file formatting, as well as the time of saving and restoring, are not present. Another feature is that the environment is creating non-optimized code, and thus the code (as embodied in the code data symbol tables, or as in the executable code tables plus link lists) is very simple, making the task of linking a less complex one.

The compiler produces the need and supply data of the link tables 58 for each module. These tables have "new", "old", "delete" tags 59 for each entry 57, and the linker 15 uses these to update only changed data in changed modules, i.e., if a module hasn't been changed then it need not be updated, and in a module that has been changed it is only those need or supply items that have been changed that need to be updated. The foreign addresses in run-time libraries 24 will remain constant, ordinarily, from one cycle to the next. So, the compiler 11 produces a table 58 for each module 12, and the incremental linker 15, when the link function is invoked, generates or updates a global link table which is a combination of all of the tables 58. This global link table contains an entry for each need or definition (supply) in any of the modules, and this table is held in memory from one cycle to the next so it need not be formatted as a file and written to storage then later recalled; the in-memory character and the fact that the bulk of the entries need not be regenerated greatly speeds up the link part of the turnaround.

These features illustrate the extraordinary demands RCASE makes on memory, and thus the importance the memory management methods described above have upon operation. Not only is the executable code for RCASE 21 itself always present, but an editor 10 and all the source code under development (as modules 12), at least one compiler 11, the debugger 22, a linker 15 and builder are simultaneously active. The collection of modules must interact with the virtual memory system in a way that avoids thrashing. The natural phasing of activity in the edit-compile-link-run cycle allows the host memory system to manage efficiently the overlay of the executable components of a running RCASE session. Most components that save state deal with only one source module at a time, leading to a requirement to allocate memory on a per-source-buffer basis. This can be done with zones, or in a more primitive fashion with the well known procedures malloc( ) and realloc( ). The incremental compiler 11 must be reasonable in the allocation of memory.

The foregoing description of the preferred embodiment of the invention has been presented for the purposes of illustration and description. It is not intended to be exhaustive or to limit the invention to the precise form disclosed. Many modifications and variations are possible in light of the above teaching. It is therefore contemplated that the appended claims will cover any such modifications or embodiments as fall within the scope of the invention.

What is claimed is:

1. In a method of generating source code "in a computter system," including creating and editing a module of source code and storing said module in a source-text buffer as a plurality of lines, compiling the module of source code from said buffer to produce a code table, linking said code table to produce a link table, said code table and said link table providing an executable object code image, and executing said code image to determine if there are errors in said module of source code, the steps of:
   a) re-editing said module of source code text, the re-edited source code being again stored in said source-text buffer as a plurality of lines, some of said lines being changed by said re-editing and some of said lines remaining the same;
   b) recompiling the re-edited said source code in said source-text buffer to produce an updated code table;
   c) relinking said updated code table to produce an updated link table, said updated code table and said updated link table providing an updated executable code image;
   d) executing said updated code image to determine if there are errors in said module of source code;
   said step of compiling including scanning lines of said source text to generate a table of lexical increments of said module of source code, and saving said lexical increment table in memory; said step of compiling also including generating code for said code table for each of said lexical increments of said table;
   said step of recompiling including rescanning only said lines of said module of source code which have been changed by said step of re-editing to update said table of lexical increments with lexical increments which have been changed and skipping lexical increments for which corresponding lexical increments have been saved from said step of scanning and related source text lines have not been changed by said re-editing; said step of recompiling also including generating code for said code table for said lexical increments which have been changed.

2. In a method according to claim 1, including the steps of creating and holding in memory rather than in files said source-text buffer, said code table, said updated code table, said link table, said updated link table, and said table of lexical increments, in said steps of creating, compiling, linking, re-editing, recompiling and relinking.

3. In a method according to claim 1, each line of said source-text buffer having an associated change-tag to indicate whether or not said line has been changed in said step of re-editing, and said skipping includes reference to said change-tag.

4. A method according to claim 1 including the step of maintaining in virtual memory said source-text buffer, said code table, said link table and said table of lexical increments.

5. A method of generating source code in a computer system, comprising the steps of:
   a) editing a module of source text using an editor, said source text of said module being stored in a source-text buffer as a plurality of lines;
   b) compiling said source text from said source-text buffer to produce a code table in memory;
   c) linking said code table to produce a link table in a buffer in memory; said code table and said link table providing an executable object code image in memory;
   d) executing said code image from memory to detect errors in said source code;
   e) re-editing said module of source text using an editor, and again storing re-edited source text in said source-text buffer as a plurality of lines;
   f) recompiling said source text from said source-text buffer to update said code table in memory;
   g) relinking the updated code table to update said link table in a buffer in memory; said updated code table and said updated link table providing an updated executable object code image in memory;
   h) executing said updated code image from memory to detect errors in said source code;
   said step of compiling including scanning lines of said source text to generate a table of lexical increments of said source text, said module containing a plurality of said lexical increments, and saving said lexical increment table in memory; said step of compiling also including generating code for said code table for each of said lexical increments of said table;
   said step of recompiling including rescanning said source text, said rescanning including "updating said table of lexical increments," skipping lexical increments for which corresponding lexical increments have been saved from said step of scanning and related source text lines have not been changed in said step of re-editing; said step of recompiling also including generating code for said code table for said lexical increments which have been changed and are not skipped.

6. A method according to claim 5 wherein each one of said lexical increments corresponds to a line of said source text, each line in said source-text buffer has an associated change-tag indicating whether said line has been changed in said step of re-editing, and said skipping includes reference to said change-tag.

7. A method according to claim 6 including the steps of saving said source-text buffer, said code table, said link table and said table of lexical increments in virtual memory, after said steps of compiling and linking.

8. A method according to claim 6 including generating a clean-lines table having an entry for each of said lines of said source-text buffer, said entry including an indication of how many following lines have not been changed in said step of re-editing, and said step of rescanning includes reference to said clean lines table.

9. A method of generating source code in a computer system, comprising the steps of:
   a) editing a plurality of modules of source text using an editor, each said module containing a plurality of lines of source text, the source text for each module being stored in one of a plurality of separate source-text buffers as a plurality of lines;
   b) compiling said source text from said source-text buffers to produce a plurality of code tables, one for each source-text buffer;
   c) linking each of said code tables to produce a link table in memory; said code tables and said link table providing an executable object code image;
   d) executing said code image;
   each of said steps of compiling, linking and executing being halted to return an error indication if an error is detected, without completing the sequence of said steps;
   e) re-editing said plurality of modules of source text using said editor, "the re-edited" source text for each module being stored in one of said separate source-text buffers as a plurality of lines upon said re-editing;
   f) recompiling said source text from said source-text buffers to produce a plurality of updated code tables, one for each source-text buffer;
   g) relinking each of said code tables to produce an updated link table; said updated code tables and said updated link table providing an updated executable object code image;
   h) executing said updated code image;
   said step of compiling including, for each one of said source-text buffers, scanning lines of said source text to generate a table of lexical increments of said source text, said module containing a plurality of said lexical increments, and saving said lexical increment table in memory; said step of compiling also including for each said buffer generating, for each increment from said lexical increment table, code for said code table;
   said step of recompiling including rescanning lines of said source text, said rescanning including skipping lexical increments for which corresponding lexical increments have been saved from said step of scanning and related source text lines have not been changed by said step of re-editing; said step of recompiling also including generating code for said code table for said lexical increments which have been changed.

10. A method according to claim 9 wherein each line in each of said source-text buffers has an associated change-tag indicating whether said line has been changed by said step of re-editing, said lines of source text corresponding to said lexical increments, and said skipping of lexical increments in said step of rescanning includes reference to said change-tags.

11. A method according to claim 10 wherein said step of recompiling includes for each one of said source text buffers generating a clean-lines table having an entry for each of said lines of said source-text buffer, said entry including an indication of how many following lines have not been changed in said step of re-editing.

12. A method according to claim 9 including the step of saving in memory all of said source-text buffers, said code tables, said link table and said increment tables.

* * * * *

UNITED STATES PATENT AND TRADEMARK OFFICE
CERTIFICATE OF CORRECTION

PATENT NO. : 5,170,465
DATED : December 8, 1992
INVENTOR(S) : William M. McKeeman et al.

It is certified that error appears in the above-indentified patent and that said Letters Patent is hereby corrected as shown below:

Column 14, line 46, change "consist" to --consistent--.

Column 19, line 22, change "trashing" to --thrashing--.

Column 20, line 58, change "override " "" to --override "\"--.

Signed and Sealed this

Twenty-fifth Day of January, 1994

Attest:

BRUCE LEHMAN

*Attesting Officer*       *Commissioner of Patents and Trademarks*